US 6,671,683 B2

(12) United States Patent
Kanno

(10) Patent No.: US 6,671,683 B2
(45) Date of Patent: Dec. 30, 2003

(54) APPARATUS FOR RETRIEVING SIMILAR DOCUMENTS AND APPARATUS FOR EXTRACTING RELEVANT KEYWORDS

(75) Inventor: Yuji Kanno, Yokohama (JP)

(73) Assignee: Matsushita Electric Industrial Co., Ltd. (JP)

( * ) Notice: Subject to any disclaimer, the term of this patent is extended or adjusted under 35 U.S.C. 154(b) by 331 days.

(21) Appl. No.: 09/892,700

(22) Filed: Jun. 28, 2001

(65) Prior Publication Data

US 2002/0016787 A1 Feb. 7, 2002

(30) Foreign Application Priority Data

Jun. 28, 2000 (JP) ........................ 2000-195075

(51) Int. Cl.[7] .............................................. G06F 17/30
(52) U.S. Cl. ........................................................ 707/5
(58) Field of Search ................................ 707/5, 3, 2, 6; 717/1; 704/5

(56) References Cited

U.S. PATENT DOCUMENTS

| 4,839,853 | A | | 6/1989 | Deerwester et al. | |
|---|---|---|---|---|---|
| 5,687,364 | A | * | 11/1997 | Saund et al. | 704/5 |
| 5,694,594 | A | * | 12/1997 | Chang | 707/6 |
| 6,424,997 | B1 | * | 7/2002 | Buskirk et al. | 709/206 |
| 6,477,551 | B1 | * | 11/2002 | Johnson et al. | 715/531 |

* cited by examiner

Primary Examiner—Wayne Amsbury
Assistant Examiner—Sana Al-Hashemi
(74) Attorney, Agent, or Firm—Parkhurst & Wendel, L.L.P.

(57) ABSTRACT

Three kinds of data, i.e., a keyword frequency-of-appearance, a document length, and a keyword weight, are produced. Then, a document profile vector and a keyword profile vector are calculated. Then, by independently performing the weighted principal component analysis considering the document length and the keyword weight, a document feature vector and a keyword feature vectors are obtained. Then, documents and keywords having higher similarity to the feature vectors calculated with reference to the retrieval and extracting conditions are obtained and displayed.

52 Claims, 12 Drawing Sheets

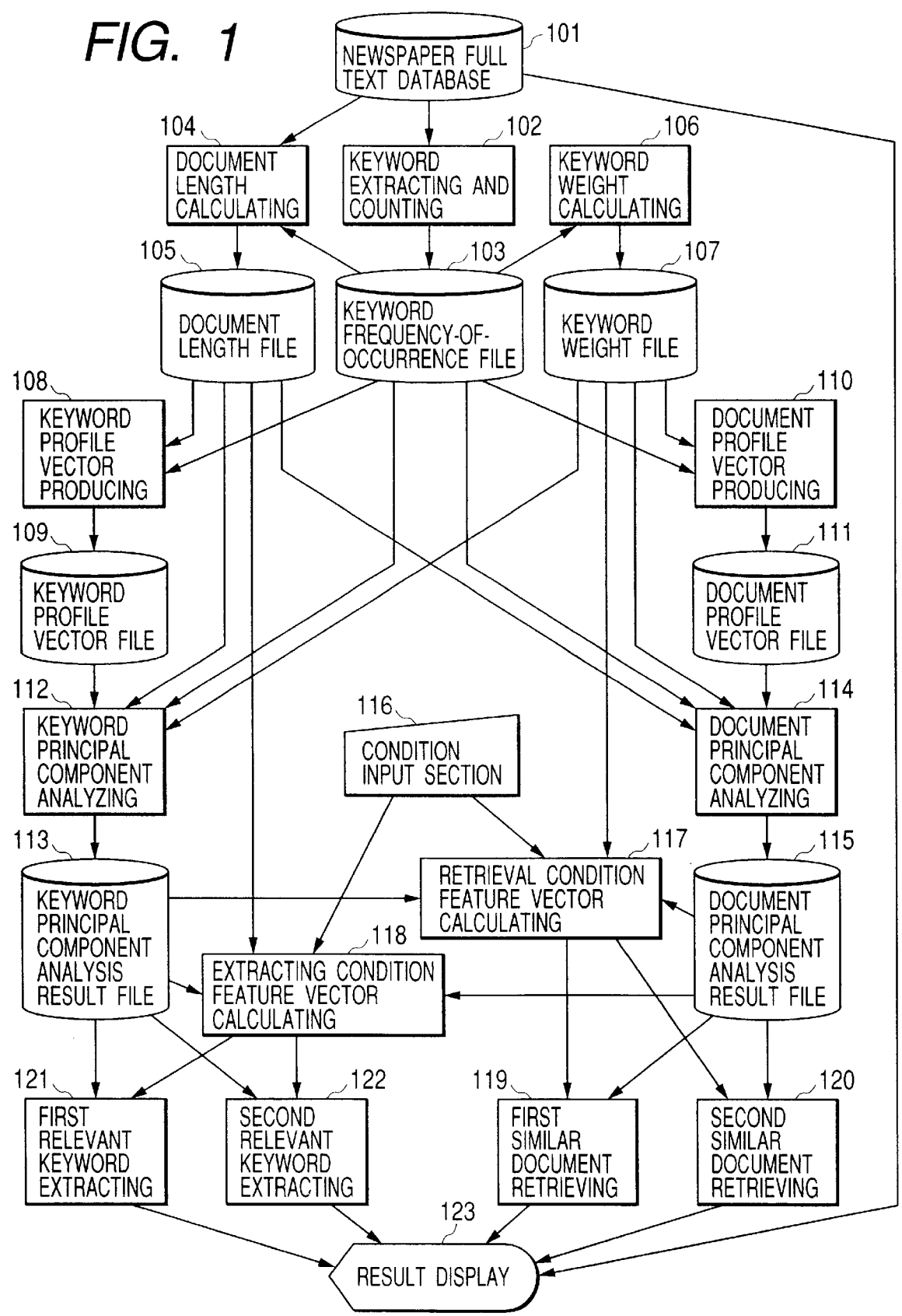

FIG. 2

CONTENT OF NEWSPAPER FULL TEXT DATABASE

1<TAB>世界経済は回復基調に――首相、年頭あいさつで年間見通しを発表<TAB>高橋首相は恒例の年頭あ
いさつで記者会見し、世界経済は中長期的には回復基調にあり、ＩＴ技術関連の企業の投資意欲の高まりやイ
ンターネット関連ビジネスの本格展開などによって、製造業やソフトウェア産業などを牽引役に、日本経済も
自立的な回復軌道に乗りつつある、との基本的認識を示した。一方で、長引く個人消費の低迷や過去最悪の失
業率に代表される雇用状況の悪化が、小売業・サービス業の業績低迷を招いており、消費意欲を掻き立てる
地域振興券の追加発行や、再雇用促進センター等における転職助成プログラムの充実に力を注ぐ決意を示した。
金融政策の面では、米国では短期金利の上昇圧力が強まっているが、米連邦準備理事会（ＦＲＢ）のファイマ
ン議長のドル高容認発言もあって、当面、国内の低金利政策の継続に賛同の意を表明した。今後は、欧州やア
ジアなどの経済動向をにらみながら慎重な金融政策を指示していく、と述べるにとどめた。<FF>
2<TAB>H3ロケット、今月８日の打ち上げを再度延期　今後の打ち上げスケジュールにも支障か?<TAB>
宇宙開拓事業団は,国産の超大型ロケット「H3」の今月8日の打ち上げを再度延期すると発表した。H3は、
同事業団が12年の歳月と膨大な人員・資金をつぎ込んで完成させた純国産の4段式の超大型原子燃料ロケット
で、欧州のスパーアリアンロケットをはるかに凌ぐ５０００トンもの機材を静止軌道上に打ち上げる能力を
誇る。H3は昨年の発射模擬実験中に発生した故障で、打ち上げが今月8日に延期されていたが、打ち上げ前
の最終点検で燃料電池の電圧低下が発見され、打ち上げに重要な支障があるかどうか、同事業団内部で検討が
続けられていた。打ち上げ日時については未定としており、同事業団が今年計画している２６基の衛星打ち上
げのスケジュールにも、支障が出ることは必至の状況となっている。<FF>
3<TAB>横浜市で乗用車とバスが衝突、一家５人重軽傷。<TAB>１９日午後２時１５分ころ、横浜市南区大
岡の県道２１号で、同市戸塚区戸塚１０２３，自動車整備工場経営、鈴木裕治さん（５６）の小型乗用車が対
向車線にはみ出し、川崎の川崎第五工業高校がチャーターした大型バスと衝突した。
鈴木さんの車に乗っていた一家５人のうち母親の無職、タエさん（９２）が頭を打って重態、裕治さんら３
人が重傷を負ったほか一人が軽いけがをした。バスにはスキー授業のため富士スキー場に向かう高校生７１人
と同高校の教師３名が乗っていたが、生徒１名が手に軽い怪我をしただけで、全員無事だった。
　横浜南署の調べによると、現場はゆるいカーブ。路面がアイスバーン状態で、小型乗用車がスリップしたら
しい。<FF>
4<TAB>松下、録画機能付きＣＳチューナを発売――。<TAB>松下電器産業は世界で初めての録画機能
を持つＣＳ（通信衛星）放送用チューナを、来月初旬に発売する。映像記録用の高性能固定ディスク装置を内
蔵し、ＣＳ放送を最大２０００時間分録画する機能を持たせた。固定ディスクによる記録のため、ＶＨＳなど、
従来のビデオテープとは異なり・・・・・。

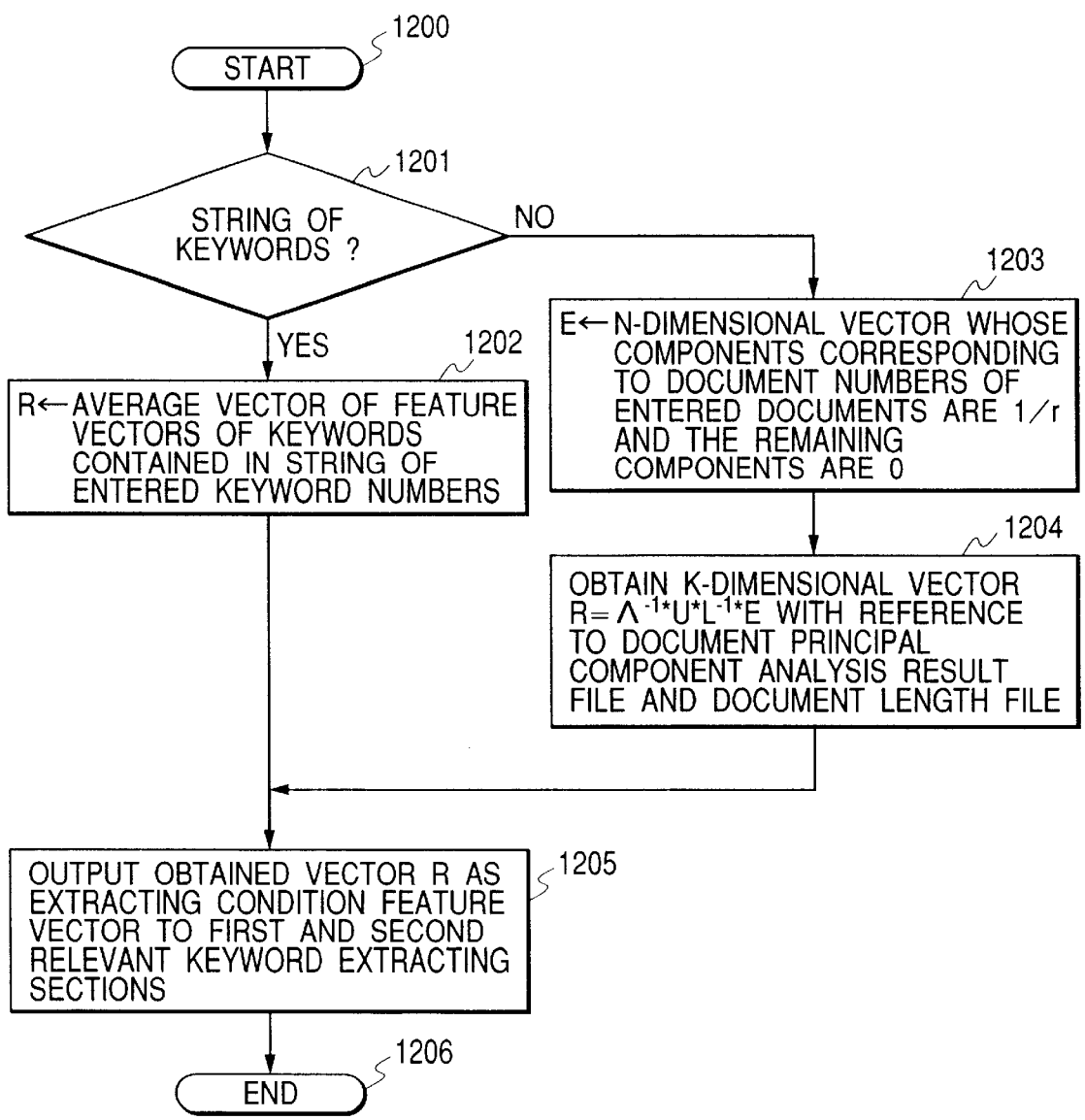

APPARATUS FOR RETRIEVING SIMILAR DOCUMENTS AND APPARATUS FOR EXTRACTING RELEVANT KEYWORDS

BACKGROUND OF THE INVENTION

The present invention relates to a similar document retrieving apparatus which designates one or plural document data from a document database (i.e., set or assembly of document data) which is electronically stored as strings of character codes and machine treatable or processible, or designates an arbitrary sentence not involved in this database, as a typical example. The similar document retrieving apparatus retrieves one or more documents similar to the designated typical example from the document database. Furthermore, the present invention relates to a relevant keyword extracting apparatus which extracts one or more keywords relating to the "typical example" from the document database. The relevant keyword extracting apparatus presents the extracted keywords to the users of this document database as an aid for comprehension of the retrieved document contents, or as a hint for preferable retrieval conditions (i.e., queries). Especially, the present invention makes it possible to perform highly accurate document retrieval and keyword extraction.

Due to recent spread of wordprocessors and personal computers as well as large-scale and low-cost storage media, such as CD-ROM and DVD-ROM, and development of network, such as Ethernet, all of the documents or most of character information can be practically stored as strings of character codes in a full text database. Such database is now widely used.

According to a conventional full text database, in retrieving the documents, a Boolean expression of keywords is generally designated as queries. It is checked whether or not a designated keyword appears in the documents. And, a document set satisfying the Boolean expression is obtained as a retrieval result.

Recently, a so-called document ranking technique is introduced and practically used. According to this ranking technique, the relevancy between each document in the obtained document set and the retrieval conditions (i.e., queries) is obtained according to a so-called "tf·idf" method or the like. Then, the documents are ranked in order of relevancy and are presented to the users.

However, this conventional full text database system is disadvantageous in the following points.

(1) When no appropriate keywords come up in mind or are found, it is difficult to designate appropriate retrieval conditions (i.e., queries).

(2) Describing a complicated Boolean expression requires a high skill and enough time.

(3) For the synonymy problem, there will be a possibility that an intended document cannot be retrieved.

In view of these problems, research and development for a similar document retrieving system or a relevant keyword extracting system has recently become vigorous so as to effectively retrieve documents similar to a designated typical example or to extract and display relevant keywords relating to the designated documents or word set.

U.S. Pat. No. 4,839,853 discloses a conventional method for retrieving similar documents, which is called as LSI (latent semantic indexing) method.

To make clear the difference between the present invention and the LSI method, the gist of the LSI method will be explained.

When applied to a document database D containing N document data, the LSI method mechanically extracts a keyword, i.e., a characteristic word representing each document, to record the frequency of occurrence (i.e., the number of times) of each keyword appearing in each document. It is now assumed that a total of M kinds of keywords are extracted from the document database D.

Extracted keywords are aligned according to a dictionary order or an appropriate order. Then, a frequence-of-appearance $f_{dt}$ of a t-th keyword is expressed as an element of d-th line and t-th row of a matrix F. Then, trough a matrix operation called as incomplete singular value decomposition, this matrix F is approximately decomposed into a product of a matrix U of N lines and K rows having document-side singular vector in each row, a diagonal matrix $\Lambda$ of K lines and L rows having singular values aligned as diagonal elements, and a matrix V of K lines and M rows having a keyword-side singular vector in each line. In this case, K is sufficiently small compared with N and M. As a result, the original frequency-of-occurrence matrix F can be approximately expressed by a lower-rank matrix.

A total of K document-side singular vectors are obtained through the above decomposition. Thus, a feature vector $U_d$ of the document d is obtained as a K-dimensional vector containing respective d-th components of the obtained K document-side singular vectors. Similarly, a total of K keyword-side singular vectors are obtained through the above decomposition. Thus, a feature vector $V_t$ of the keyword t is obtained as a K-dimensional vector containing respective t-th components of the obtained K keyword-side singular vectors.

Subsequently, calculation of similarity and relevancy is performed according to the following three procedures so as to obtain documents and keywords having higher similarities and relevancies, thereby realizing the similar document retrieval and the relevant keyword extraction.

(1) The similarity between two documents a and b is obtained by calculating an inner product $U_a \cdot U_b$ between the document feature vectors $U_a$ and $U_b$ of these documents a and b.

(2) The relevancy between two keywords Ka and Kb is obtained by calculating an inner product $V_a \cdot V_b$ between two keyword feature vectors $V_a$ and $V_b$ of these keywords Ka and Kb.

(3) Keyword extraction result from an arbitrary (external) document is represented by a M-dimensional vector E having components representing frequency-of-occurrence values of M keywords appearing in this document. A retrieval condition document feature vector $P_e$ corresponding to this external document is represented by an expression $U_e = \Lambda^{-1} V E$. Then, the similarity between this external document and the document d in the document database is obtained as a product $U_d \cdot U_e$. The above-described procedures are a fundamental framework of the LSI method.

However, if the keyword frequency-of-appearance $f_{dt}$ is directly used in the application of the LSI method to an actual document database, the feature vector obtained will be somewhat deviated due to presence of longer documents or frequently appearing keywords. This will significantly worsen the accuracy of similar document retrieval.

Hence, the LTC method conventionally used in the relevant ranking of a document retrieving system or a comparative method is introduced to convert or normalize the keyword frequency-of-occurrence $f_{dt}$. Then, a frequency-of-occurrence matrix F is created so as to contain the normalized frequency-of-occurrence values. Then, the incomplete singular value decomposition is performed to obtain a feature vector.

For example, according the LTC conversion, the following equation is used to calculate a frequency-of-occurrence LTC ($f_{dt}$) based on the actual frequency-of-occurrence $f_{dt}$ the number $n_t$ of documents containing the keyword t. A matrix containing this value is subjected to the incomplete singular value decomposition.

$$LTC(f_{dt}) = \frac{(1 + \log_2 f_{dt})\log_2\left(1 + \frac{N}{n_i}\right)}{\sqrt{\sum_j \left\{(1 + \log_2 f_{dj})\log_2\left(1 + \frac{N}{nj}\right)\right\}^2}} \quad (1)$$

However, the conversion of keyword frequency-of-occurrence by the conventional LSI method causes the following problems.

Analysis according to the LSI method is performed on the assumption that a d-th line of the matrix F represents the feature of document d and a t-th row of the matrix F represents the feature of keyword t. In a first conversion, a square-sum of line elements can be normalized to 1. However, a square-sum of row elements cannot be normalized to 1. Accordingly, the performed conversion becomes asymmetric between the document side and the keyword side. Thus, the simple conversion using the above equation 1 cannot normalize both of the document side and the keyword side to 1. Such asymmetry can be found in a conversion using other equation.

Furthermore, when a logarithmic function or other non-linear function is used in the conversion as shown in the equation 1, the feature of certain document d is not identical with the feature of document d' consisting of two successive documents d. Therefore, the similarity between the document d and the document d' is not equal to 1. Similarly, when two keywords $t_1$ and $t_2$ are identical in the frequency-of-occurrence as well as in the meaning, a frequency-of-occurrence matrix obtained on the assumption that two keywords $t_1$ and $t_2$ are the same does not agree with the original frequency-of-occurrence matrix.

The above-described asymmetry or the above-described non-stability caused by the mergence of documents or keywords with respect to the document similarity or the keyword relevancy causes the following phenomenons when a large-scale document database is processed.

(1) In the retrieving and extracting operation at the non-normalized side (i.e., keyword side in many cases), large norms (i.e., square-sum of elements of F) are chiefly retrieved or extracted.

(2) When a document retrieval is performed in a keyword set, only certain keywords have very strong effects and others are almost neglected.

Consequently, the obtained retrieval result will be the ones far from the intent of the retrieval. Thus, the accuracy of retrieval is greatly worsened.

SUMMARY OF THE INVENTION

To solve the above-described problems of the prior art, the present invention has an object to provide a similar document retrieving apparatus and a relevant keyword extracting apparatus which can normalize both of the document side and the keyword side and maintain higher retrieving accuracy.

To accomplish the above and other related objects, the present invention provides a first similar document retrieving apparatus applicable to a document database D which stores N document-data containing a total of M kinds of keywords and is machine processible, for designating a retrieval condition (i.e., query) consisting of a document group including at least one document $x_1$, - - - , $X_r$ selected from the document database D and for retrieving documents similar to the document group of the retrieval condition from the document database D. The first similar document retrieving apparatus of this invention comprises: keyword frequency-of-occurrence calculating means for calculating a keyword frequency-of-occurrence data F which represents a frequency-of-occurrence $f_{dt}$ of each keyword t appearing in each document d stored in the document database D; document length calculating means for calculating a document length data L which represents a length $l_d$ of each document d; keyword weight calculating means for calculating a keyword weight data W which represents a weight $w_t$ of each keyword t of the M kinds of keywords appearing in the document database D; document profile vector producing means for producing a M-dimensional document profile vector $P_d$ having components respectively representing a relative frequency-of-occurrence $p_{dt}$ of each keyword t in the concerned document d; document principal component analyzing means for performing a principal component analysis on a document profile vector group of a document group in the document database D and for obtaining a predefined (K)-dimensional document feature vector $U_d$ corresponding to the document profile vector $P_d$ for each document d; and similar document retrieving means for receiving the retrieval condition consisting of the document group including at least one document $x_1$, - - - , $x_r$ selected from the document database D, calculating a similarity between each document d and the retrieval condition based on a document feature vector of the received document group and the document feature vector of each document d in the document database D, and outputting a designated number of similar documents in order of the calculated similarity.

Furthermore, the present invention provides a second similar document retrieving apparatus applicable to a document database D which stores N document data containing a total of M kinds of keywords and is machine processible, for designating a retrieval condition (i.e., query) consisting of a keyword group including at least one keyword $y_1$, - - - , $y_s$ selected from the document database D and for retrieving documents relevant to the retrieval condition from the document database D. In addition to the above-described keyword frequency-of-occurrence calculating means, the document length calculating means, the keyword weight calculating means, and the document profile vector producing means, the second similar document retrieving apparatus of this invention comprises: keyword profile vector calculating means for calculating a N-dimensional keyword profile vector $Q_t$ having components respectively representing a relative frequency-of-occurrence $q_{dt}$ of the concerned keyword t in each document d; document principal component analyzing means for performing a principal component analysis on a document profile vector group of a document group in the document database D and for obtaining a predefined (K)-dimensional document feature vector $U_d$ corresponding to the document profile vector $P_d$ for each document d; keyword principal component analyzing means for performing a principal component analysis on a keyword profile vector group of a keyword group in the document database D and for obtaining a predefined (K)-dimensional keyword feature vector $V_t$ corresponding to the keyword profile vector $Q_t$ for each keyword t, the keyword feature vector having the same dimension as that of the document feature vector, as well as for obtaining a keyword contribution factor (i.e., eigenvalue of a correlation matrix) $\theta_j$ of each dimension j; retrieval condition feature vector calculating means for receiving the retrieval condition (i.e., query) consisting of keyword group including at least one keyword $y_1, ---, y_s$, and for calculating a retrieval condition feature vector corresponding to the retrieval condition (i.e., query) based on the keyword weight data of the received keyword group, the keyword feature vector and the keyword contribution factor; and similar document retrieving means for calculating a similarity between each document d and the retrieval condition based on the calculated retrieval condition feature vector and a document feature vector of each document d, and outputting a designated number of similar documents in order of the calculated similarity.

Furthermore, the present invention provides a first relevant keyword extracting apparatus applicable to a document database D which stores N document data containing a total of M kinds of keywords and is machine processible, for designating an extracting condition consisting of a keyword group including at least one keyword $y_1, ---, y_s$ selected from the document database D and for extracting keywords relevant to the keyword group of the extracting condition from the document database D. In addition to the above-described keyword frequency-of-occurrence calculating means, the document length calculating means, and the keyword weight calculating means, the second relevant keyword extracting apparatus of this invention comprises: keyword profile vector calculating means for calculating a N-dimensional keyword profile vector $Q_t$ having components respectively representing a relative frequency-of-occurrence $q_{dt}$ of the concerned keyword t in each document d; keyword principal component analyzing means for performing a principal component analysis on a keyword profile vector group of a keyword group in the document database D and for obtaining a predefined (K)-dimensional keyword feature vector $V_t$ corresponding to the keyword profile vector $Q_t$ for each keyword t; and relevant keyword extracting means for receiving the extracting condition consisting of the keyword group including at least one keyword $y_1, ---, y_s$ selected from the document database D, calculating a relevancy between each keyword t and the extracting condition based on a keyword feature vector of the received keyword group and the keyword feature vector of each keyword t in the document database D, and outputting a designated number of relevant keywords in order of the calculated relevancy.

Furthermore, the present invention provides a second relevant keyword extracting apparatus applicable to a document database D which stores N document data containing a total of M kinds of keywords and is machine processible, for designating an extracting condition consisting of a document group including at least one document $x_1, ---, x_r$ selected from the document database D and for extracting keywords relevant to the document group of the extracting condition from the document database D. In addition to the above-described keyword frequency-of-occurrence calculating means, the document length calculating means, the keyword weight calculating means, the document profile vector producing means, and the keyword profile vector calculating means, the second relevant keyword extracting apparatus of this invention comprises: document principal component analyzing means for performing a principal component analysis on a document profile vector group of a document group in the document database D and for obtaining a predefined (K)-dimensional document feature vector $U_d$ corresponding to the document profile vector $P_d$ for each document d as well as for obtaining a document contribution factor (i.e., eigenvalue of a correlation matrix) $\lambda_j$ of each dimension j; keyword principal component analyzing means for performing a principal component analysis on a keyword profile vector group of a keyword group in the document database D and for obtaining a predefined (K)-dimensional keyword feature vector $V_t$ corresponding to the keyword profile vector $Q_t$ for each keyword t, the keyword feature vector having the same dimension as that of the document feature vector; extracting condition feature vector calculating means for receiving the extracting condition consisting of the document group including at least one document $x_1, ---, x_r$, and for calculating an extracting condition feature vector corresponding to the extracting condition based on the document length data of the received document group, the document feature vector and the document contribution factor; and relevant keyword extracting means for calculating a relevancy between each keyword t and the extracting condition based on the calculated extracting condition feature vector and a keyword feature vector of each keyword t, and outputting a designated number of relevant keywords in order of the calculated relevancy.

According to the similar document retrieving apparatus and the relevant keyword extracting apparatus of the present invention, the frequency-of-occurrence of each keyword in a concerned document is expressed as a document profile vector and the frequency-of-appearance of a concerned keyword in each document as a keyword profile vector. A weighted principal component analysis considering the document length and the keyword weight is independently performed to obtain both of a document feature vector and a keyword feature vector.

In this case, the vector representation in the document profile and in the keyword profile is not dependent on the conversion (i.e., normalization) of frequency-of-occurrence. The document length data and the keyword weight data, relevant to the conversion of frequency-of-occurrence, are indirectly reflected as the weight in the principal component analysis. Thus, it becomes possible to perform the normalization without depending on the conversion of frequency-of-occurrence.

As a result, the present invention makes it possible to provide the similar document retrieving apparatus and the relevant keyword extracting apparatus which are highly accurate.

BRIEF DESCRIPTION OF THE DRAWINGS

The above and other objects, features and advantages of the present invention will become more apparent from the following detailed description which is to be read in conjunction with the accompanying drawings, in which:

FIG. 1 is a block diagram showing an overall arrangement of a similar document retrieving and relevant keyword extracting system in accordance with a preferred embodiment of the present invention;

FIG. 2 is a view showing an example of a newspaper full text database;

FIG. 12 is a flowchart showing the procedure for calculating an extracting condition feature vector in accordance with the preferred embodiment of the present invention.

DESCRIPTION OF A PREFERRED EMBODIMENT

Figure 3:
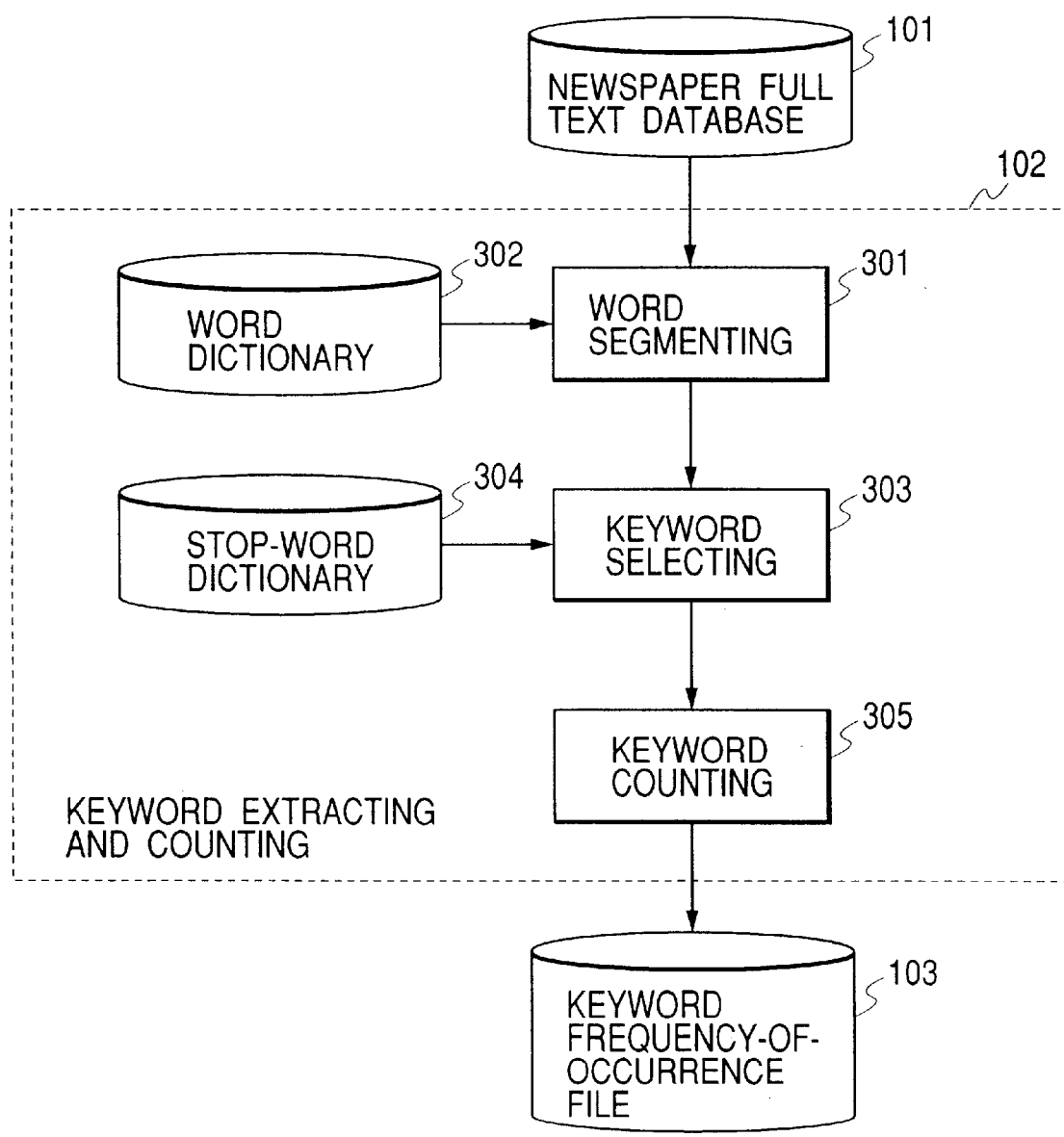
FIG. 3 is a block diagram showing an internal arrangement of a keyword extracting and counting section in accordance with the preferred embodiment of the present invention.

Hereinafter, a preferred embodiment of the present invention will be explained with reference to the attached drawings. Identical parts are denoted by the same reference numerals throughout the views.

FIG. 1 is a block diagram showing an overall arrangement of a similar document retrieving and relevant keyword extracting system which is realized as a function of a digital electronic computer and acts as a similar document retrieving apparatus and a relevant document extracting apparatus in accordance with a preferred embodiment of the present invention.

This system comprises a newspaper full text database 101 storing various news documents together with their document numbers, headlines, and text bodies. Each news document, i.e., individual newspaper article, serves as a retrieval unit. A keyword extracting and counting section 102 scans character strings in the text body of each newspaper article stored in the newspaper full text database 101 to extract keywords appearing in each newspaper article and to count each keyword as the frequency of occurrence of this word. A keyword frequency-of-occurrence file 103 stores an extraction and counting result obtained by the keyword extracting and counting section 102. A document length calculating section 104 calculates a document length of each newspaper article according to a document length calculation mode given as an external parameter based on the number of characters in character strings contained in the body of each newspaper article by accessing the newspaper full text database 101 or based on the total number of keywords appearing in each newspaper article by accessing the keyword frequency-of-occurrence file 103. A document length file 105 stores calculation result obtained by the document length calculating section 104. A keyword weight calculating section 106 calculates a weighted value of each keyword with reference to the keyword frequency-of-occurrence file 103. A keyword weight file 107 stores calculation result obtained by the keyword weight calculating section 106. A keyword profile vector producing section 108 produces a keyword profile vector representing the feature of each keyword based on the keyword frequency-of-occurrence file 103 and the document length file 105. A keyword profile vector file 109 stores keyword profile vector groups produced by the keyword profile vector producing section 108. A document profile vector producing section 110 produces a document profile vector representing the feature of each document based on the keyword frequency-of-occurrence file 103 and the keyword weight file 107. A document profile vector file 111 stores document profile vector groups produced by the document profile vector producing section 110.

A keyword principal component analyzing section 112 performs K-dimensional weighted principal component analysis of the keyword profile vector file 109 with reference to the keyword frequency-of-occurrence file 103, the document length file 105, and the keyword weight file 107, wherein K is a predetermined external parameter. Through the K-dimensional weighted principal component analysis, the keyword principal component analyzing section 112 obtains a total of K principal axes (i.e., eigenvector of correlation matrix) and a contribution factor of each principal axis (i.e., eigenvalue of correlation matrix). And, the keyword principal component analyzing section 112 obtains a feature vector (i.e., component or projection of K principal axes) of each keyword. A keyword principal component analysis result file 113 stores analysis result, i.e., feature vector of each keyword and contribution factor of each principal axis, obtained by the keyword principal component analyzing section 112.

A document principal component analyzing section 114 performs K-dimensional weighted principal component analysis of the document profile vector file 111 with reference to the keyword frequency-of-occurrence file 103, the document length file 105, and the keyword weight file 107. Through the K-dimensional weighted principal component analysis, the document principal component analyzing section 114 obtains a total of K principal axes and a contribution factor of each principal axis. And, the document principal component analyzing section 114 obtains a feature vector (i.e., component or projection of K principal axes) of each document. A document principal component analysis result file 115 stores analysis result, i.e., feature vector of each document and contribution factor of each principal axis, obtained by the document principal component analyzing section 114.

A condition input section 116 allows an operator to input similar article retrieving and relevant keyword extracting conditions for retrieving the newspaper full text database 101 according to the form of either the string of document numbers or the string of keywords. When a string of document numbers is entered through the condition input section 116, a retrieval condition feature vector calculating section 117 calculates a retrieval condition feature vector corresponding to the entered string of document numbers with reference to a corresponding document feature vector in the document principal component analysis result file 115. Furthermore, when a string of keywords is entered through the condition input section 116, the retrieval condition feature vector calculating section 117 calculates a retrieval condition feature vector corresponding to the entered string of keywords with reference to the keyword weight file 107 and the keyword principal component analysis result file 113.

When a string of document numbers is entered through the condition input section 116, an extracting condition feature vector calculating section 118 calculates an extracting condition feature vector corresponding to the entered string of document numbers with reference to the document length file 105 and the document principal component analysis result file 115. Furthermore, when a string of keywords is entered through the condition input section 116, the extracting condition feature vector calculating section 118 calculates an extracting condition feature vector corresponding to the entered string of keywords with reference to a corresponding keyword feature vector in the keyword principal component analysis result file 113.

A first similar document retrieving section 119 calculates an inner product (a maximum value of the inner product in the case a plurality of documents are designated) between the retrieval condition feature vector calculated by the retrieval condition feature vector calculating section 117 and each document feature vector in the document principal component analysis result file 115. Then, the first similar document retrieving section 119 determines document numbers of 1st to R-th largest documents in the calculated inner product value (R represents the number of acquired documents which is a predetermined external parameter).

A second similar document retrieving section 120 calculates a distance (a minimum value of the distance in the case a plurality of documents are designated) between the retrieval condition feature vector calculated by the retrieval condition feature vector calculating section 117 and each document feature vector in the document principal component analysis result file 115. Then, the second similar document retrieving section 120 determines document numbers of 1st to R-th smallest documents in the calculated distance value.

A first relevant keyword extracting section 121 calculates an inner product (a maximum value of the inner product in the case a plurality of keywords are designated) between the extracting condition feature vector calculated by the extracting condition feature vector calculating section 118 and each keyword feature vector in the keyword principal component analysis result file 113. Then, the first relevant keyword extracting section 121 determines 1st to S-th largest keywords in the calculated inner product value (S represents the number of acquired keywords which is a predetermined external parameter).

A second relevant keyword extracting section 122 calculates a distance (a minimum value of the distance in the case a plurality of keywords are designated) between the extracting condition feature vector calculated by the extracting condition feature vector calculating section 118 and each keyword feature vector in the keyword principal component analysis result file 113. Then, the second relevant keyword extracting section 122 determines 1st to S-th smallest keywords in the calculated distance value.

A result display section 123 displays the document numbers and titles of retrieved R similar articles as well as the extracted S keywords with their similarities which are displayed in order of the magnitude of similarity.

Next, an operation of the above-described similar document retrieving and relevant keyword extracting system will be explained.

First, a schematic operation of this system will be explained. This system can retrieve newspaper articles by accessing the newspaper full text database 101. When an operator designates document numbers, e.g., 2, 4, 9- - - , of the articles similar to an intended article through the condition input section 116, this system retrieves articles similar to the designated articles and extracts keywords relevant to the retrieved articles. The result display section 123 displays the retrieved similar documents and the extracted relevant keywords. When an operator designates a string of keywords, e.g., IT, internet, - - - , through the condition input section 116, this system retrieves articles similar to the articles containing the designated keywords and extracts keywords relevant to the retrieved articles. The result display section 123 displays the retrieved similar documents and the extracted relevant keywords.

The operation of this system consists of the following three stages (I), (II) and (III) which are performed in this order.

(I) Prior to the similar document retrieving and relevant keyword extracting operation, the newspaper full text database 101 are segmented into keywords and processed into three kinds of data: frequency of occurrence of each keyword; length of each document; and weight of each keyword.

(II) A profile vector data, serving as an object of principal component analysis, is produced for each of document and keyword. The document profile vector data is a vector whose components represent relative frequency-of-occurrence values of respective keywords in a concerned document. The keyword profile vector data is a vector whose components represent relative frequency-of-occurrence values of a concerned keyword in each document in the document database.

Next, considering the document length and the keyword weight, the principal component analysis is performed for respective profile vector data to obtain feature vectors of respective documents and keywords (i.e., vectors having featured components).

(III) When the conditions for the similar document retrieving and relevant keyword extracting operation are entered, feature vectors of the similar document retrieval conditions and the relevant keyword extracting conditions are calculated according to the type of entered conditions (i.e., document number or keyword) with reference to the analysis result of the second stage (II) as well as the document length and the keyword weight. Similarity between the retrieval condition feature vector and the document feature vector of each document and relevancy between the extracting condition feature vector and the keyword feature vector of each keyword are calculated based on the inner product or the distance between the vectors. Then, a designated number of similar documents and relevant keywords are displayed together with their similarities.

Furthermore, the following parameters are set beforehand to execute the above operation.

Document Length Calculating Mode ("Number of Characters" or "Number of Words")

This is a parameter determining a data serving as a basis for defining the document length of a concerned newspaper article. When the "number of characters" is selected, the document length of a concerned newspaper article is calculated based on the number of characters involved in the text body of the concerned article. When the "number of words" is selected, the document length of a concerned newspaper article is calculated based on the total number of keywords (including repetitive counting of the same keyword) obtained from the text body of the concerned article.

Document Length Threshold ($l_0$)

This is a parameter, being a nonnegative integer, determining a lower limit of the document length in calculating the document length of a concerned newspaper article. When the number of characters or the total number of keywords is smaller than the document length threshold $l_0$, the document length of the concerned newspaper article is calculated by using the document length threshold $l_0$ instead of using an actual value.

Document Length Root ($\delta$)

This is a parameter, being a nonnegative integer, determining a document length based on a data serving as a basis for the document length in calculating the document length of a concerned newspaper article. The document length of a concerned newspaper article is calculated as a $\delta$-th root of the number of characters or the total number of keywords. When the number of characters or the total number of keywords is smaller than the document length threshold $l_0$, the document length of the concerned newspaper article is calculated as a $\delta$-th root of the document length threshold $l_0$.

Keyword Weight Calculating Mode ("1+log" or "log")

This is a first parameter determining a method of calculating the weight of a concerned keyword. When a "1+log" mode is selected, the weight of a concerned keyword is calculated according to an expression $1+\log_2(N/n)$ where N represents the number of all the documents and n represents the number of documents involving the concerned keyword. When a "log" mode is selected, the weight of a concerned keyword is calculated according to an expression $\log_2((N+1)/n)$. When a keyword weight offset $\in$ is not 0, the keyword weight is calculated based on corrected values for the entire document number N and the keyword related document number n.

Keyword Weight Offset ($\in$)

This is a second parameter determining a method of calculating the weight of a concerned keyword. A keyword weight offset $\in$ is added to each of the entire document number N and the keyword related document number n. In calculating the keyword weight, $N+\in$ and $n+\in$ are used as representing the entire document number and the keyword related document number. Thus, by using $N+\in$ and $n+\in$, the keyword weight is calculated according to the above-described keyword weight calculating mode.

Analysis Dimension (K)

This is a parameter, being a positive integer, determining the dimension of analysis in performing the principal component analysis. When the K-dimension is designated, a total of K (at maximum) sets of eigenvalues and eigenvectors of the correlation matrix data are obtained to express the K-dimensional feature vectors for the document and the keyword.

Document Similarity Calculating Mode ("Inner Product" or "Distance")

This is a parameter designating either the first similar document retrieving section 119 or the second similar document retrieving section 120 as a source of similar document retrieval result to be displayed on the result display section 123. When the "inner product" mode is selected, the result display section 123 displays the retrieval result obtained by the first similar document retrieving section 119. When the "distance" mode is selected, the result display section 123 displays the retrieval result obtained by the second similar document retrieving section 120.

Keyword Relevancy Calculating Mode ("Inner Product" or "Distance")

This is a parameter designating either the first relevant keyword extracting section 121 or the second relevant keyword extracting section 122 as a source of relevant keyword extraction result to be displayed on the result display section 123. When the "inner product" mode is selected, the result display section 123 displays the extraction result obtained by the first relevant keyword extracting section 121. When the "distance" mode is selected, the result display section 123 displays the extraction result obtained by the second relevant keyword extracting section 122.

Displayed Similar Document Number ($\alpha$)

This is a parameter determining the number of documents to be displayed as the result of similar document retrieval. When the displayed similar document number $\alpha$ is designated, a total of $\alpha$ documents are displayed in order of the magnitude of similarity.

Displayed Relevant Keyword Number ($\beta$)

This is a parameter determining the number of keywords to be displayed as the result of relevant keyword extraction. When the displayed relevant keyword number $\beta$ is designated, a total of $\beta$ keywords are displayed in order of the magnitude of relevancy.

After the settings of above-described parameters is finished, the stages (I) and (II) are performed successively based on the thus preset parameters to analyze the newspaper full text database 101, thereby accomplishing the preparation for the similar document retrieval and relevant keyword extraction. After this moment, when the conditions for the similar document retrieving and relevant keyword extracting operation are entered through the condition input section 116, the stage (III) is performed based on the preset parameters with reference to the analysis result obtained in the stages (I) and (II) to obtain the similar documents and relevant keywords. The obtained similar documents and relevant keywords are displayed on the result display section 123. In a case where the similar document retrieving and relevant keyword extracting operation is performed repetitively by accessing the same newspaper full text database 101, the analyzing processing of the stages (I) and (II) is performed only one time and the processing of the stage (III) is performed repetitively as much as necessary.

The system operates schematically as described above. Next, the detailed operation of the system will be explained successively in order of the stages (I), (II) and (III).

First, the processing in the stage (I) is explained with reference to the drawings. In the stage (I), keywords contained in the newspaper full text database 101 are segmented and processed into three kinds of data: frequency of occurrence of each keyword; length of each document; and weight of each keyword.

FIG. 2 shows part of an example of the contents of newspaper full text database 101.

As shown in FIG. 2, the newspaper full text database 101 is a text format which is editable and readable through an electronic computer. Each newspaper article is regarded as a single document serving as a retrieval unit. The newspaper full text database 101 stores a total of 200,000 newspaper articles according to the ascending order of their document numbers. Each newspaper article can be classified according to three fields of document number, title, and text body. Three kinds of fields are connected in this order by means of tab character (i.e., a sort of control character indicated as <TAB> in the drawing). One document and the next document are connected by means of form feed character (i.e., a sort of control character indicated as <FF> in the drawing). Document number 1 is assigned to a head or leading (i.e., first) newspaper article. Document number 200,000 is assigned to the last (i.e., 200,000th) newspaper article.

First, the newspaper full text database is entered into the keyword extracting and counting section 102.

FIG. 3 is a block diagram showing an internal arrangement of the keyword extracting and counting section 102 which is encircled by a dotted line. The keyword extracting and counting section 102 comprises a word segmenting section 301, a word dictionary 302, a keyword selecting section 303, an stop-word dictionary 304, and a keyword counting section 305.

First, the word segmenting section 301 reads out one document from the newspaper full text database 101 and picks up any words (morphemes) capable of becoming keyword candidates. A similar document retrieving apparatus and a relevant keyword extracting apparatus according to the present invention do not depend on a specific word segmenting method. Hence, various word segmenting methods conventionally known can be used in the present invention.

For example, "Iwanami Course.Language Science 3.Word and Dictionary" by Yuji MATSUMOTO et al, 1997, Iwanami Shoten Publishers, discloses a word segmenting technique using a morphelosical analysis based on a dictionary and an adjacent cost or a statistic language model. The unexamined Japanese patent publication No. 10-69493 discloses a word segmentation using only a word dictionary according to a "maximal segmenting" method.

According to this embodiment, words are segmented by using the word dictionary 302, for example, according to the "maximal segmenting" method disclosed in the unexamined Japanese patent publication No. 10-69493.

The keyword selecting section 303 judges with reference to the stop-word dictionary 304 whether or not each segmented word is an extraneous or unnecessary word in performing the similar document retrieving and relevant keyword extracting operation. When judged as not being a stop word, the segmented word is recognized as a keyword. A keyword number is assigned to each newly recognized keyword according to the recognized order. The keyword counting section 305 counts the frequency of appearance of each keyword appearing in one document (i.e., one newspaper article). After processing all of the character strings contained in one document, the count result of this document is sent to the keyword frequency-of-occurrence file 103. Then, the processing of the next document is commenced.

Through the above-described operation, all of the documents involved in the newspaper full text database 101 are processed in order of the document number and the keyword frequency-of-occurrence file 103 is created.

Figure 4:
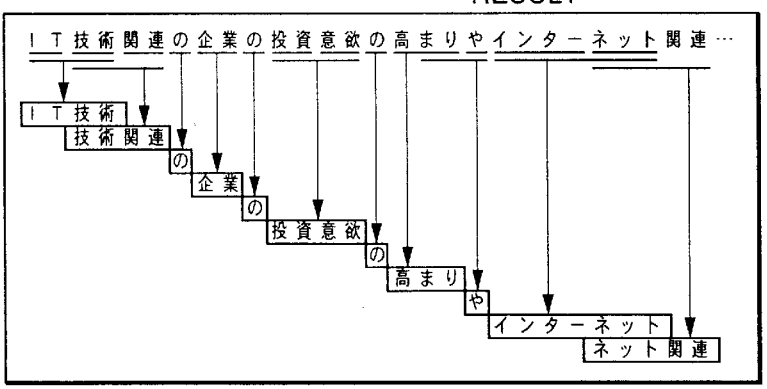
FIG. 4 is a conceptual diagram showing a practical example of the keyword extracting and counting processing in accordance with the preferred embodiment of the present invention.

FIG. 4 shows a practical example of the word segmenting processing. In FIG. 4, "word segmentation result" shows an example of partial result obtained through the word segmentation performed on a text body field of a document #1 according to the maximal word segmenting method with reference to a left word dictionary. Each underlined word (i.e., character string) is a word registered in the dictionary. Each word or character string encircled by a rectangular line is a segmented word or character string. Then, stop words, such as "の" and "を", are removed from the segmentation result. The frequency of occurrence of each word is counted to obtain "keyword extraction result of document #1."

Figure 5:
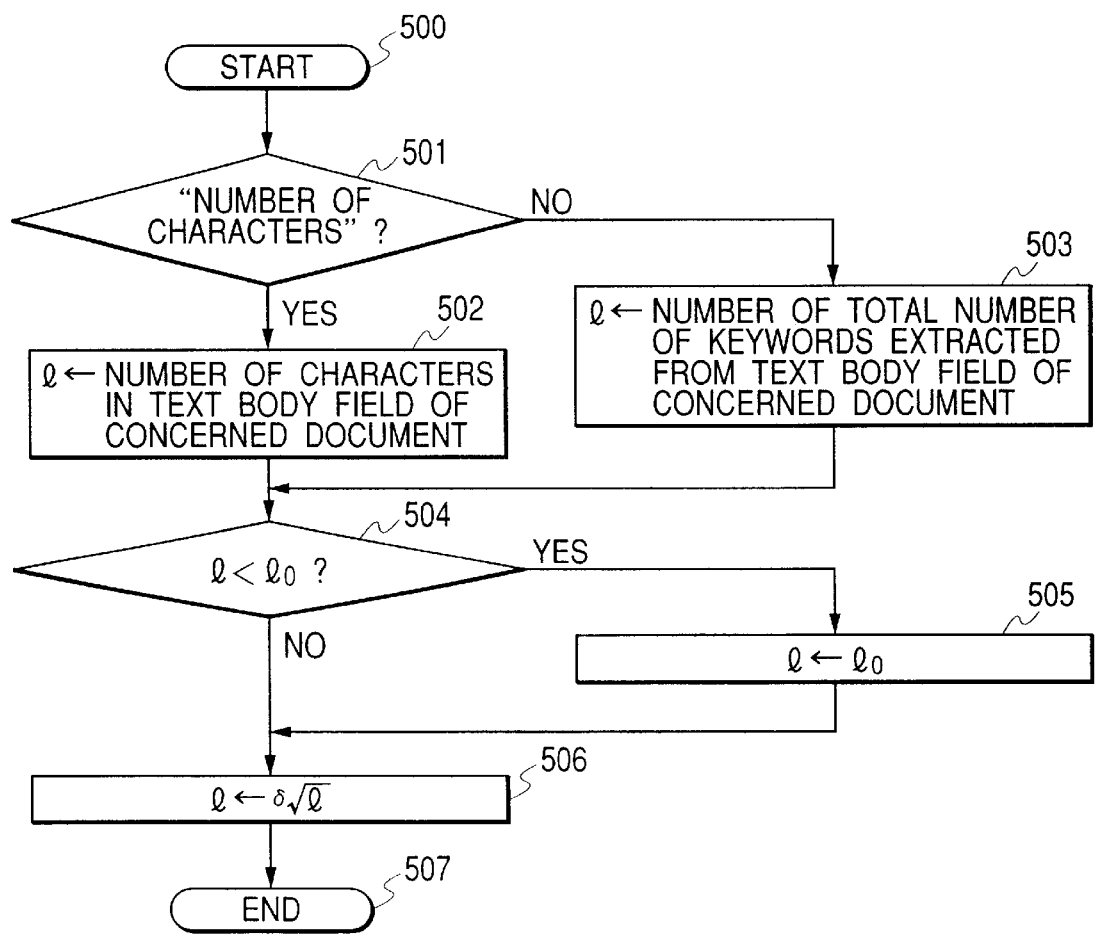
FIG. 5 is a flowchart showing the procedure for creating document length data in accordance with the preferred embodiment of the present invention.

Next, the document length calculating section 104 calculates the length of each document according to three kinds of predetermined parameters: document length calculating mode; document length threshold ($l_0$); and document length root ($\delta$). FIG. 5 is a flowchart showing a procedure for calculating the document length of a concerned document.

In step 501, it is checked whether the document length calculating mode is the "number of characters" or not. When the document length calculating mode is the "number of characters", the control flow proceeds to step 502. When the document length calculating mode is the "number of words", the control flow proceeds to step 503.

In step 502, i.e., when the document length calculating mode is the "number of characters", l is referred to as representing the number of characters contained in a text body field of the concerned document which is obtained with reference to the newspaper full text database 101.

In step 503, i.e., when the document length calculating mode is the "number of words", l is referred to as representing the total number of keywords (including repetitive counting of the same keyword) segmented from the text body field of the concerned document which is obtained with reference to the keyword frequency-of-occurrence file 103.

In step 504, it is checked whether or not the calculated value l of step 502 or 503 is smaller than the document length threshold $l_0$.

If l is smaller than $l_0$, the control flow proceeds to step 505 to replace the value l with $l_0$.

After finishing step 505 or if l is not smaller than $l_0$, the control flow proceeds to step 506 to further replace the value l with a $\delta$-th root of l. The value l thus calculated represents the document length of the concerned document and is recorded in the document length file 105.

For example, the document length calculating mode is set to the "number of characters", the document length threshold $l_0$ is set to 200, and the document length root $\delta$ is 0.5. Document #1 shown in FIG. 2 contains 396 characters in the text body field. In this case, the document length l of document #1 is calculated as 19.9 through the above-described processing. As document #3 shown in FIG. 2 contains 302 characters in the text body field, the document length l of document #3 is calculated as 17.38 through the above-described processing. In this manner, the above-described processing for obtaining the document length l is performed for all of the documents in order of the document number, thereby accomplishing the document length file 105.

Figure 6:
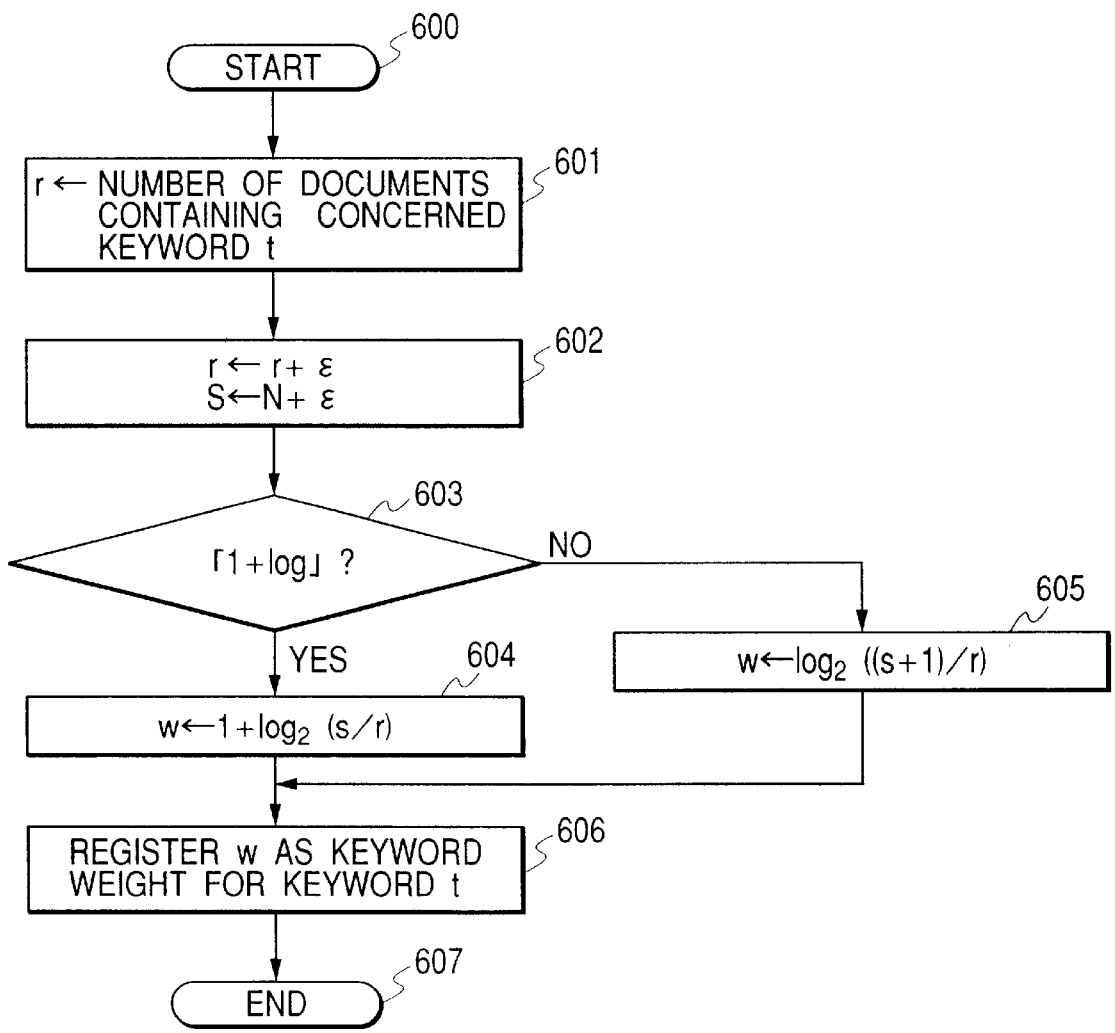
FIG. 6 is a flowchart showing the procedure for creating keyword weight data in accordance with the preferred embodiment of the present invention.

While the document length calculating processing is performed, the keyword weight calculating section 106 calculates a weight of each keyword according to two kinds of predetermined parameters: the keyword weight calculating mode; and the keyword weight offset ($\in$). FIG. 6 is a flowchart showing a procedure for calculating the keyword weight of a specific keyword t.

In step 601, the number r of documents containing the concerned keyword t is calculated with reference to the keyword frequency-of-occurrence file 103.

In step 602, the number r obtained in step 601 is replaced by a sum of the number r and the keyword weight offset $\in$ (i.e. r←r+$\in$). Meanwhile, a value s is given as a sum of the number N of all documents and the keyword weight offset $\in$ (i.e. s←N+$\in$).

In step 603, it is checked whether the keyword weight calculating mode is "1+log" or not. When the keyword weight calculating mode is "1+log", the control flow proceeds to step 604. When the keyword weight calculating mode is "log", the control flow proceeds to step 605.

In step 604, i.e., when the keyword weight calculating mode is "1+log", w is represented by an expression $1+\log_2(s/r)$.

In step 605, i.e., when the keyword weight calculating mode is "log", w is represented by an expression $\log_2((s+1)/r)$.

In step 606, the calculated value w is sent to the keyword weight file 107 and registered as a keyword weight for the concerned keyword t.

The above-described processing for obtaining the keyword weight w is performed for all of the keywords in order of the keyword number, thereby accomplishing the keyword weight file 107.

For example, the keyword weight calculating mode is set to "1+log", and the keyword weight offset ∈ is set to 10. It is now assumed that a keyword "I 技術 (IT technology)" appears in the text body of a total of 22 newspaper articles. In this case, the keyword weight of "IT技術 (IT technology)" is calculated as 13.61 through the above-described processing. It is also assumed that a keyword "国内 (domestic)" appears in the text body of a total of 2519 newspaper articles. In this case, the keyword weight of "国内 (domestic)" is calculated as 7.31 through the above-described processing.

In this manner, through the processing of stage (I), the keyword frequency-of-occurrence file 103, the document length file 105, and the keyword weight file 107 are created.

Second, the processing in the stage (II) is explained with reference to the drawings. In the stage (II), the profile vector data of document/keyword is produced. The principal component analysis is performed for respective profile vector data to obtain feature vectors of respective documents and keywords.

Figure 7:
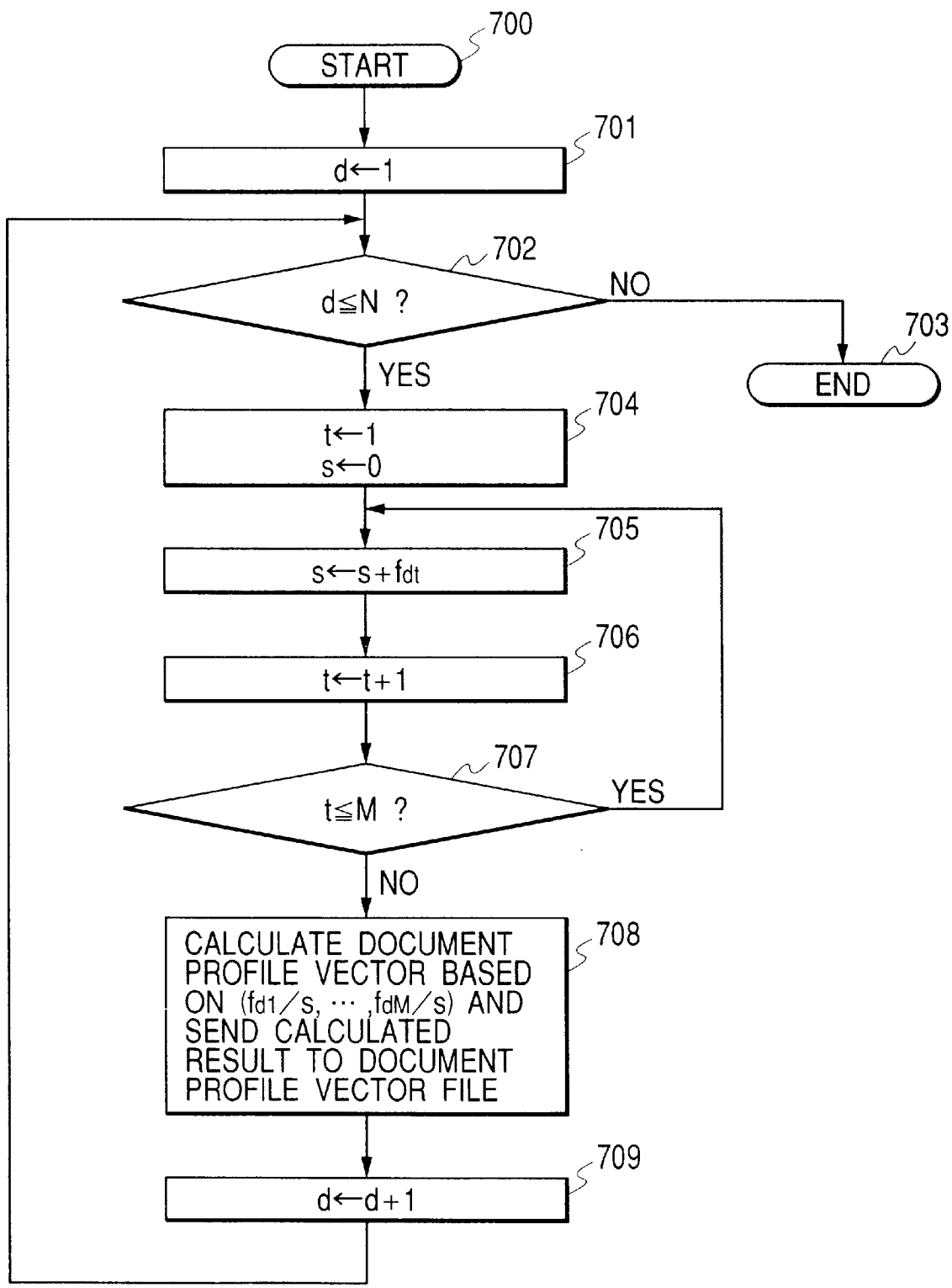
FIG. 7 is a flowchart showing the procedure for creating document profile vector data in accordance with the preferred embodiment of the present invention.

FIG. 7 is a flowchart showing a procedure for calculating the document profile vector data.

In step 701, to create a document profile vector, a concerned document number d is initialized to 1 (i.e., d←1).

In step 702, it is checked whether or not the concerned document number d is equal to or smaller than the number N of all documents. When d is larger than N, the control flow proceeds to step 703 to terminate this calculation processing. When d is equal to or smaller than N, the control flow proceeds to step 704.

In step 704, the keyword number t is initialized to 1, and the normalized factor s is initialized to 0.

In step 705, a frequency-of-occurrence $f_{dt}$ of the keyword t of the document d is obtained with reference to the keyword frequency-of-occurrence file 103. Then, the normalized factor s is replaced with a sum of s and $f_{dt}$ (i.e., s←s+$f_{dt}$).

In step 706, the concerned keyword number t is incremented by 1 (i.e., t←t+1).

In step 707, it is checked whether the keyword number t is equal to or smaller than the number M of all keywords. When t is equal to or smaller than M, the control flow returns to step 705 to process the next keyword.

Through the above steps 704 to 707, repetitive appearances of the same keyword are counted every time to obtain the total number of keywords appearing in the document d. The obtained total is referred to as the normalized factor s.

After the normalized factor s is obtained according to the document profile vector calculating mode in this manner, the control flow proceeds to step 708.

In step 708, the document profile vector of the document d is calculated based on a relative frequency-of-occurrence vector (i.e., ($f_{d1}$/s, - - - , $f_{dM}$/s)) and sent to the document profile vector file 111.

In step 709, the concerned document number d is incremented by 1 (d←d+1). Then, the control flow returns to step 702 to process the next document.

Through the above-described processing, the document profile vector file 111 is created.

For example, when a calculation value of the normalized factor s is 92, the document profile vector of the document #1 in the newspaper article full text database shown in FIG. 2 is obtained in the following manner with reference to the keywords numbered in the word dictionary of FIG. 4.

(2/92, 1/92, 0, 1/92, 1/92, 0, 0, 1/92, - - - )

where the first component of the document profile vector corresponds to #1 keyword "あいさつ" stored in the word dictionary. Similarly, second and third components correspond to #2 keyword "IT" and #3 keyword "IT技術" in the word dictionary.

Figure 8:
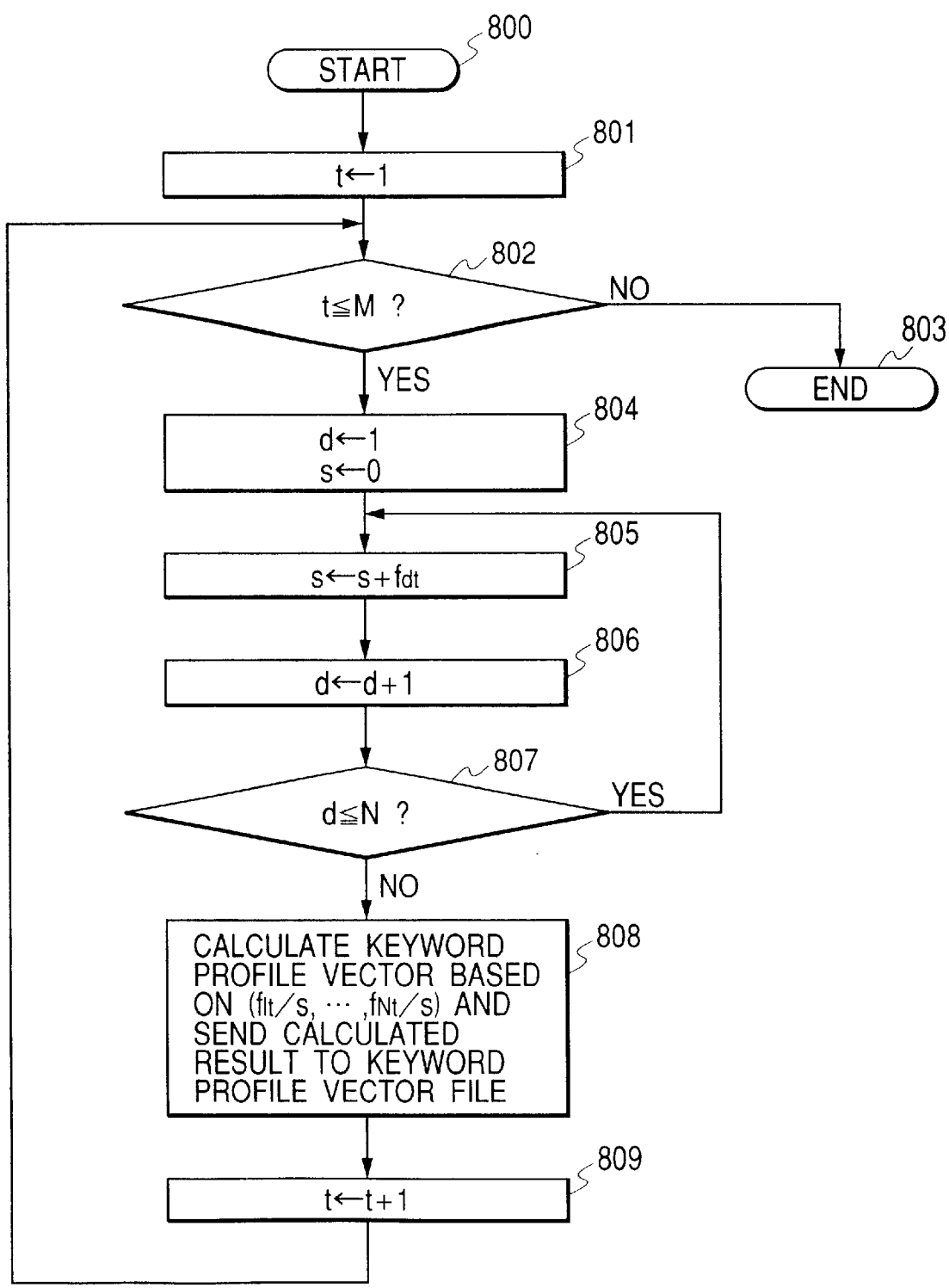
FIG. 8 is a flowchart showing the procedure for creating keyword profile vector data in accordance with the preferred embodiment of the present invention.

While the document profile vector file 111 is created, the keyword profile vector file 109 is created. FIG. 8 is a flowchart showing a procedure for calculating the keyword profile vector data.

In step 801, to produce a keyword profile vector, a concerned keyword number t is initialized to 1 (i.e., t←1).

In step 802, it is checked whether or not the concerned keyword number t is equal to or smaller than the number M of all keywords. When t is larger than M, the control flow proceeds to step 803 to terminate this calculation processing. When t is equal to or smaller than M, the control flow proceeds to step 804.

In step 804, the document number d is initialized to 1, and the normalized factor s is initialized to 0.

In step 805, a frequency-of-occurrence $f_{dt}$ of the keyword t of the document d is obtained with reference to the keyword frequency-of-occurrence file 103. Then, the normalized factor s is replaced with a sum of s and $f_{dt}$ (i.e., s←s+$f_{dt}$).

In step 806, the concerned document number d is incremented by 1 (i.e., d←d+1).

In step 807, it is checked whether the document number d is equal to or smaller than the number N of all documents. When d is equal to or smaller than N, the control flow returns to step 805 to process the next keyword.

Through the above steps 804 to 807, repetitive appearances of the same document are counted every time to obtain the total number of documents containing the concerned keyword t. The obtained total is referred to as the normalized factor s.

After the normalized factor s is obtained according to the keyword profile vector calculating mode in this manner, the control flow proceeds to step 808.

In step 808, the keyword profile vector of the keyword t is calculated based on a relative frequency-of-occurrence vector (i.e., ($f_{1t}$/s, - - - , $f_{Nt}$/s)) and sent to the keyword profile vector file 109.

In step 809, the concerned keyword number t is incremented by 1 (t←t+1). Then, the control flow returns to step 802 to process the next keyword.

Through the above-described processing, the keyword profile vector file 109 is created.

For example, when a calculation value of the normalized factor s is 283, the keyword profile vector of #1 keyword "あいさつ" in the newspaper article full text database shown in FIG. 2 is obtained in the following manner.

(1/283, 0, 0, 0, 0, 0, 1/283, - - - )

where the first component of the keyword profile vector corresponds to a relative frequency-of-occurrence of #1 keyword "あいさつ" in a newspaper article of the document #1. Similarly, the second component corresponds to a relative frequency-of-occurrence of the #1 keyword "あいさつ" in a newspaper article of the document #2.

In this manner, the frequency-of-occurrence of the keyword "あいさつ" in the document #1 is converted into different values and incorporated into vectors at the document side and the keyword side. This is apparently different from the conversion of keyword frequency-of-appearance data according to the conventional LSI method. In other words, prior to the statistical analysis, such as principal component analysis, the present invention introduces the vector representations for the document and the word which are essentially different from conventional ones.

Furthermore, each of the document profile vector and the keyword profile vector is stable and not dependent on the document length and the keyword weight.

After creating both of the document and keyword profile vector files, the document principal component analyzing section 114 and the keyword principal component analyzing section 112 perform the principal component analysis on respective profile vector data with reference to the document length and the keyword weight. Through the principal component analysis, feature vectors of K dimensions (K is predetermined as an "analysis dimension") of each document and each keyword are obtained together with the contribution factor of each dimension.

Regarding the principal component analysis of document data, the analysis is performed based on the following fundamental procedures.

(1) To calculate an inner product between document profile vectors $P_a$ and $P_b$ of two documents a and b stored in the newspaper full text database 101, the following product-sum of weighted components is introduced.

$$\Sigma w_t * f/h_t * p_{at} * p_{bt} \quad (2)$$

($\Sigma$ represents a sum from t=1 to M)

where $w_t$ represents a weight of each keyword t stored in the keyword weight file 107, $h_t$ represents an overall frequency-of-occurrence value of keyword t stored in the newspaper full text database 101, and f represents the sum of frequency-of-occurrence values of all keywords in the newspaper full text database 101. A square root of $h_t/f$ represents a degree of dispersion (i.e., an evaluation value of standard deviation) of components $P_{at}$ and $P_{bt}$ of the document profile vectors $P_a$ and $P_b$. In this respect, the above formula (2) contains two factors of weight $w_t$ and the square root of $h_t/f$.

(2) The principal component analysis is executed on the assumption that the document profile vectors of the document d of the document length $l_d$ are contained in a document profile vector group serving as an object of the principal component analysis by the number proportional to a ratio $g_d/l_d$, where $g_d$ represents the total number of all keywords appearing in the document d and $l_d$ represents the document length of the document d.

Meaning of the above-described two fundamental procedures for the document data principal component analysis is as follows. First, the procedure (1) is equivalent to obtaining an inner product by assuming that there are a total of M coordinate axes (each corresponding to a keyword) in a space of M-dimensional document profile vector, and the space of M-dimensional document profile vector is a distorted space according to which calibrations of respective M coordinate axes are different from each other. Furthermore, it is assumed that there are a plurality of coordinate axes relating to each keyword t and the number of related coordinate axes is proportional to the weight $w_t$ of the keyword.

Namely, so as to equalize a dispersion of each component corresponding to the frequency of occurrence (=each keyword), the components $P_{at}$ and $P_{bt}$ of two document profile vectors $P_a$ and $P_b$ are respectively divided by $(h_t/f)^{1/2}$ and then multiplied with each other. Furthermore, by assuming that the number of products thus produced is equal to $w_t$, the keyword weight is directly reflected to the inner product between the document profile vectors.

Next, according to the procedure (2), an importance of each document is regarded as $g_d/l_d$ representing a frequency-of-appearance density of keyword, i.e., "the total number" of keywords appearing per unit document length. In the principal component analysis of a total of N document profile vectors, the statistical analysis processing is performed on the assumption that the profile vectors of each document d are contained by the number corresponding to the importance $g_d/l_d$. Thus, the analysis of this invention is performed by thinking much of the documents having higher importance. In other words, the feature vectors resulting from this analysis indirectly reflect the importance of each document.

Regarding the degree of dispersion of components $P_{at}$ and $P_{bt}$ of the document profile vectors Pa and Pb, i.e., an expression "square root of $h_t/f$" representing an evaluation value of standard deviation, it is possible to derive the degree of dispersion through approximation of the appearance probability of each keyword t in the document d by using a Poisson distribution having an average and a dispersion of $(g_d * h_t)/f$, where $g_d$ represents the total number of keywords appearing in the document d and f represents the total number of keywords appearing in the newspaper full text database.

Figure 9:
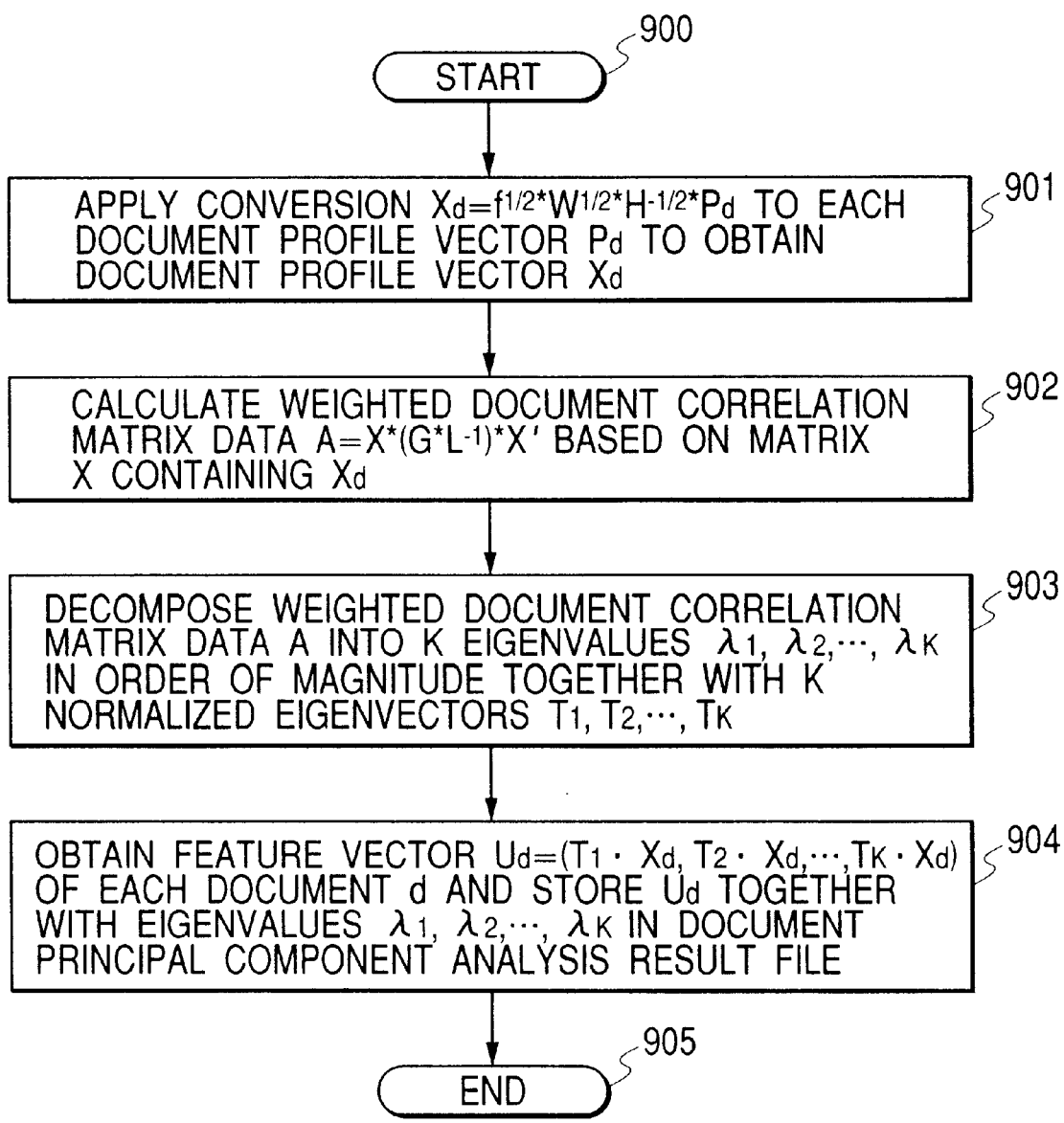
FIG. 9 is a flowchart showing the procedure for executing a principal component analysis on the document profile vector data in accordance with the preferred embodiment of the present invention.

FIG. 9 is a flowchart of the principal component analysis performed in the document principal component analyzing section 114.

In step 901, a coordinate conversion is performed to deform the "distorted space" of the procedure (1) into an ordinary space which enables to obtain an internal product of vectors as a product-sum of components. The coordinate conversion is applied to each document profile vector $P_d$ to calculate a document profile vector $X_d$ resulting from this coordinate conversion according the following formula.

$$X_d = f^{1/2} * W^{1/2} * H^{-1/2} * P_d \quad (3)$$

where $f^{1/2}$ represents a square root of "the total number" f of all keywords appearing in the newspaper full text database, $W^{1/2}$ represents a diagonal matrix of M lines×M rows containing a square root $w_t^{1/2}$ of the keyword weight $w_t$ of the keyword t as an element of t-th line and t-th row, and $H^{-1/2}$ represents a diagonal matrix of M lines×M rows containing an inversed square root $h_t^{-1/2}$ of the overall frequency-of-occurrence value of keyword t stored in the newspaper full text database as an element of t-th line and t-th row. By applying this conversion, it is easily confirmed that the inner product of the document profile vector $X_d$ resulting from the conversion is representable as a product-sum of the components.

Next, in step 902, a weighted document correlation matrix data A is calculated based on a matrix X of M lines×N rows containing a value $X_d$ (refer to formula 3) in the d-th row as well as its transposed matrix X' according to the following formula.

$$A = X * (G * L^{-1}) * X' \quad (4)$$

where G represents a diagonal matrix of N lines×N rows containing "the total number" $g_d$ of keywords appearing in the document d as an element of d-th line and d-th row, and $L^{-1}$ represents a diagonal matrix of N lines×N rows containing an inverse number $l_d^{-1}$ of the document length $l_d$ of the document d as an element of d-th line and d-th row.

Next, in step 903, the obtained matrix A is numerically decomposed into a total of K eigenvalues $\lambda 1, \lambda 2, ---, \lambda_K$ successively in order of magnitude as well as a total of K eigenvectors $T_1, T_2, ---, T_k$ normalized so as to correspond to the decomposed eigenvalues.

Finally, in step 904, a feature vector $U_d$ of each document d is obtained as the following K-dimensional vector of the converted document profile vector $X_d$ which has components representing projections to the K eigenvectors obtained in step 903.

$$U_d = (T_1 \cdot X_d, T_2 \cdot X_d, ---, T_K \cdot X_d) \tag{5}$$

Then, considering K eigenvalues $\lambda 1, \lambda 2, ---, \lambda_K$ as "contribution factors", a total of N vectors $U_d$ of K dimensions are obtained as the "feature vector" of each document and stored in the document principal component analysis result file 115.

Regarding the principal component analysis of keyword, the analysis is performed based on the following fundamental procedures.

(1) To calculate an inner product between keyword profile vectors $Q_a$ and $Q_b$ of two keywords Ka and Kb appearing in the newspaper full text database 101, the following product-sum of weighted components is introduced.

$$\Sigma f / (l_d * g_d) * q_{ad} * q_{bd} \tag{6}$$

where $l_d$ represent the document length of document d stored in the document length file 105, $g_d$ represents the total number of all keywords appearing in the document d, and f represents the sum of frequency-of-occurrence values of all keywords in the newspaper full text database 101. A square root of $g_d/f$ represents a degree of dispersion (i.e., an evaluation value of standard deviation) of components $q_{ad}$ and $q_{bd}$ of the keyword profile vectors $Q_a$ and $Q_b$. In this respect, the above formula (6) contains two factors of document length $l_d$ and the square root of $g_d/f$.

(2) The principal component analysis is executed on the assumption that the keyword profile vectors of the keyword t of the keyword weight $w_t$ are contained in a keyword profile vector group serving as an object of the principal component analysis by the number proportional to a $h_t * w_t$, where $h_t$ represents an overall frequency-of-occurrence value of keyword t stored in the newspaper full text database 101 and $w_t$ represents the keyword weight of the keyword t.

Meaning of the above-described two fundamental procedures for the keyword principal component analysis is as follows. First, the procedure (1) is equivalent to obtaining an inner product by assuming that there are a total of N coordinate axes (each corresponding to a document) in a space of N-dimensional keyword profile vector, and the space of N-dimensional keyword profile vector is a distorted space according to which calibrations of respective N coordinate axes are different from each other. Furthermore, it is assumed that there are a plurality of coordinate axes relating to each document d and the number of related coordinate axes is inverse proportional to the document length $l_d$.

Namely, so as to equalize a dispersion of each component corresponding to the frequency of occurrence (=relative frequency-of-occurrence in each document), the components $q_{ad}$ and $q_{bd}$ of two keyword profile vectors $Q_a$ and $Q_b$ are respectively divided by $(g_d/f)^{1/2}$ and then multiplied with each other. Furthermore, by assuming that the number of products thus produced is equal to $l_d^{-1}$, the document length is directly reflected to the inner product between the keyword profile vectors.

Next, according to the procedure (2), an importance of each keyword is regarded as $h_t/w_t$. In the principal component analysis of a total of M keyword profile vectors, the statistical analysis processing is performed on the assumption that the profile vectors of each keyword t are contained by the number corresponding to the importance $h_t/w_t$. Thus, the analysis of this invention is performed by thinking much of the keywords having higher importance. In other words, the feature vectors resulting from this analysis indirectly reflect the importance of each keyword.

Regarding the degree of dispersion of components $q_{ad}$ and $q_{bd}$ of the keyword profile vectors $Q_a$ and $Q_b$, i.e., an expression "square root of $g_d/f$" representing an evaluation value of standard deviation, it is possible to derive the degree of dispersion through approximation of the appearance probability of each keyword t in the document d by using a Poisson distribution having an average and a dispersion of $(g_d * h_t)/f$, where $g_d$ represents the total number of keywords appearing in the document d and f represents the total number of keywords appearing in the newspaper full text database.

The keyword analysis processing of this invention can be performed independently without giving any influence to the document analysis processing, and is therefore different from the conventional LSI method.

Figure 10:
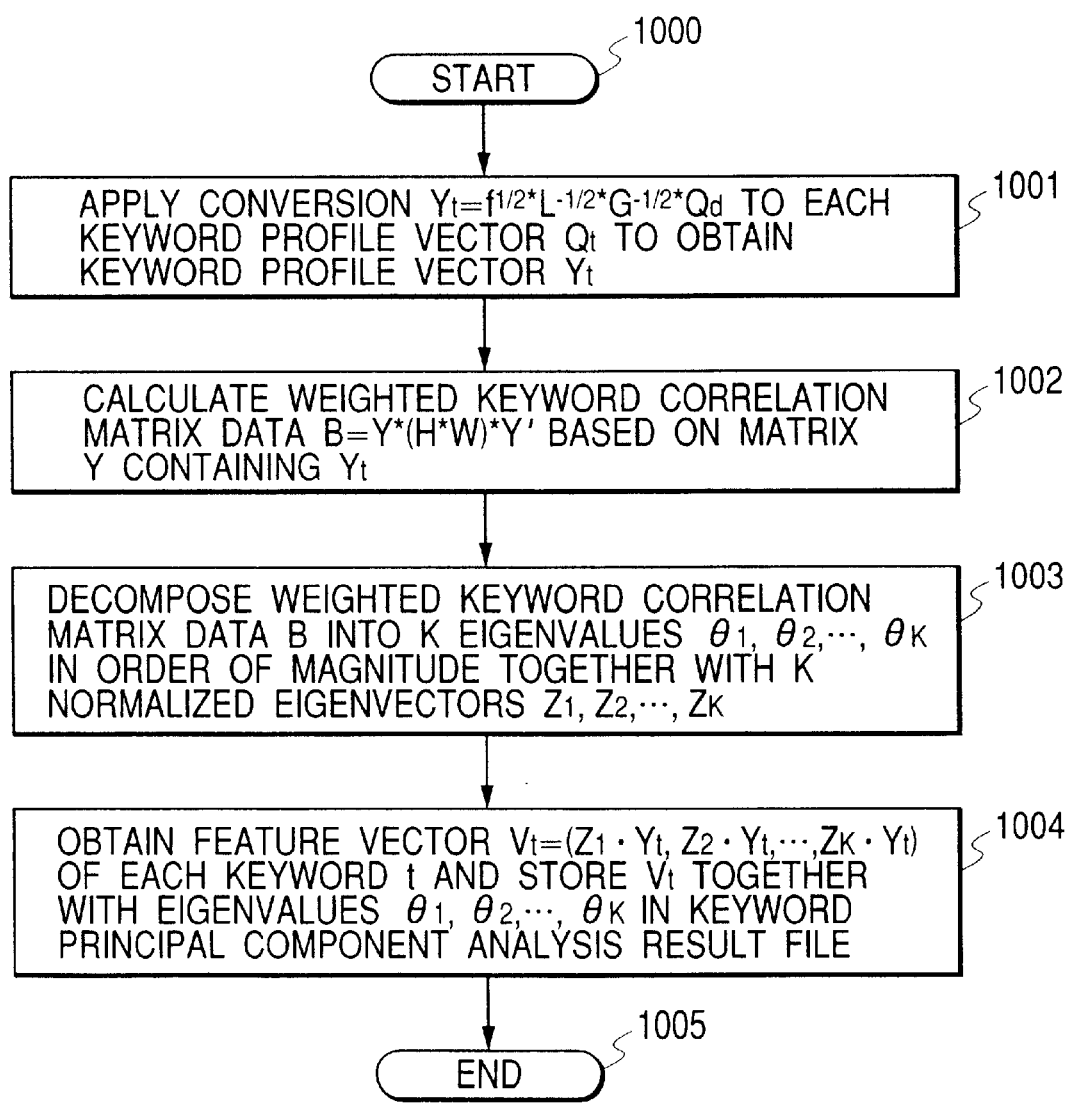
FIG. 10 is a flowchart showing the procedure for executing a principal component analysis on the keyword profile vector data in accordance with the preferred embodiment of the present invention.

FIG. 10 is a flowchart of the principal component analysis performed in the keyword principal component analyzing section 112.

In step 1001, a coordinate conversion is performed to deform the "distorted space" of the procedure (1) into an ordinary space which enables to obtain an internal product of vectors as a product-sum of components. The coordinate conversion is applied to each keyword profile vector $Q_t$ to calculate a keyword profile vector $Y_t$ resulting from this coordinate conversion according the following formula.

$$Y_t = f^{1/2} * L^{-1/2} * G^{-1/2} * Q_d \tag{7}$$

where $f^{1/2}$ represents a square root of "the total number" f of all keywords appearing in the newspaper full text database, $L^{-1/2}$ represents a diagonal matrix of N lines×N rows containing an inversed square root $l_d^{-1/2}$ of the document length $l_d$ of the document d as an element of d-th line and d-th row, and $G^{-1/2}$ represents a diagonal matrix of N lines×N rows containing an inversed square root $g_d^{-1/2}$ of the total number of keywords appearing in the document d as an element of d-th line and d-th row. By applying this conversion, it is easily confirmed that the inner product of the keyword profile vector $Y_t$ resulting from the conversion is representable as a product-sum of the components.

Next, in step 1002, a weighted keyword correlation matrix data B is calculated based on a matrix Y of M lines×N rows containing a value $Y_t$ (refer to formula 7) in the d-th row as well as its transposed matrix Y' according to the following formula.

$$B = Y * (H * W) * Y' \tag{8}$$

where H represents a diagonal matrix of M lines×M rows containing the overall frequency-of-appearance value $h_t$ of the keyword t as an element of t-th line and t-th row, and W represents a diagonal matrix of M lines×M rows containing the weight $w_t$ of the keyword t as an element of t-th line and t-th row.

Next, in step 1003, the obtained matrix B is numerically decomposed into a total of K eigenvalues $\theta 1, \theta 2, ---, \theta_K$ successively in order of magnitude as well as a total of K eigenvectors $Z_1, Z_2, ---, Z_k$ normalized so as to correspond to the decomposed eigenvalues.

Finally, in step 1004, a feature vector $V_t$ of each keyword t is obtained as the following K-dimensional vector of the converted keyword profile vector $Y_t$ which has components representing projections to the K eigenvectors obtained in step 1003.

$$V_t=(Z_1 \cdot Y_t, Z_2 \cdot Y_t, \text{---}, Z_K \cdot Y_t) \qquad (9)$$

Then, considering K eigenvalues $\theta 1$, $\theta 2$, - - - , $\theta_K$ as "contribution factors", a total of M vectors $V_t$ of K dimensions are obtained as the "feature vector" of each keyword and stored in the keyword principal component analysis result file 113.

As described above, after accomplishing the processing of stage (II), the keyword principal component analysis result file 113 and the document principal component analysis result file 115 are created via the keyword profile vector file 109 and the document profile vector file 111. At this moment, all of the preparations necessary for receiving retrieval/extraction conditions are completed.

After this moment, when the conditions for the similar document retrieval and relevant keyword extraction (either a string of document numbers or a string of keywords) are entered through the condition input section 116, the processing of stage (III) is initiated for the similar document retrieval and relevant keyword extraction.

Figure 11:
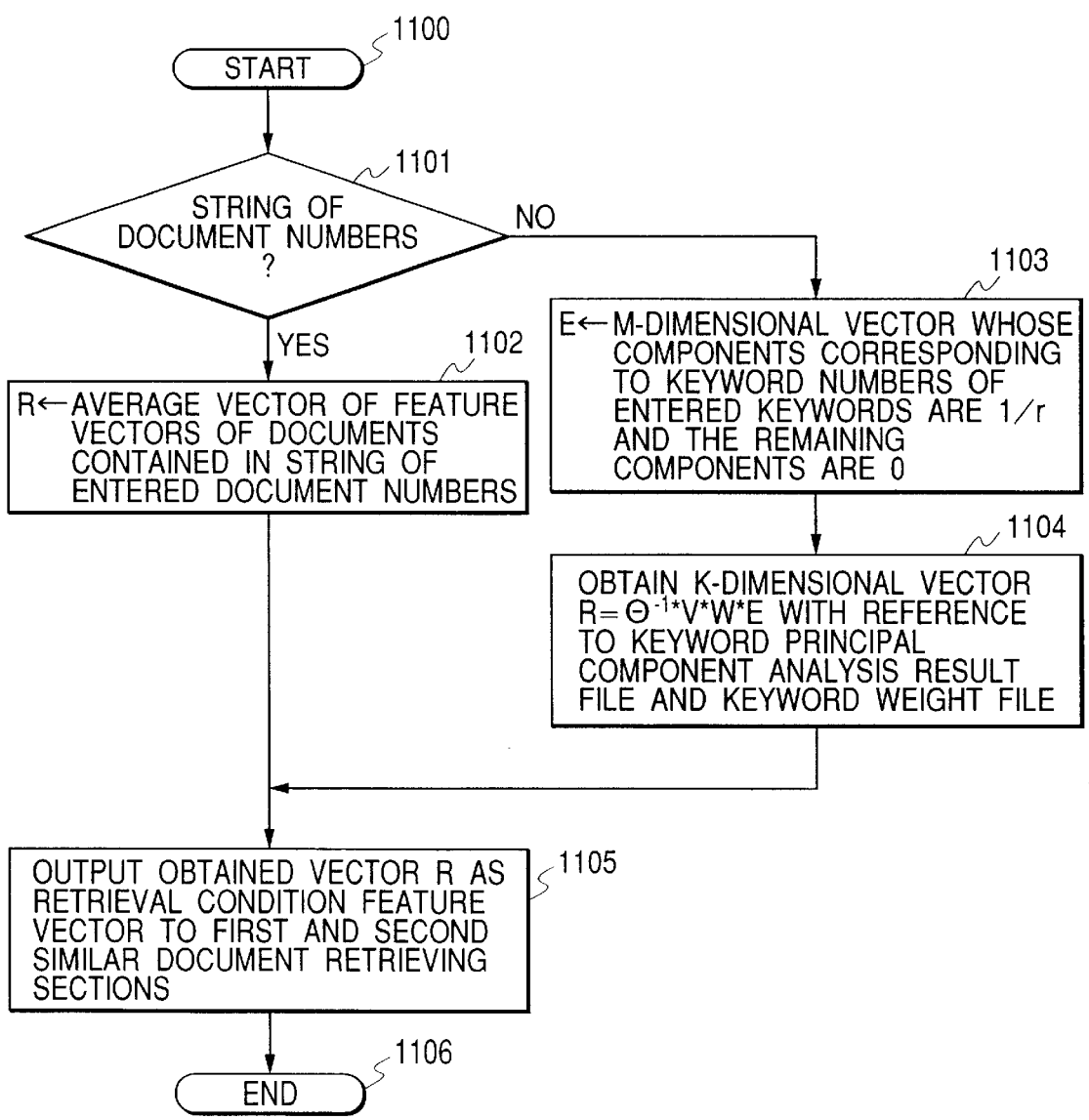
FIG. 11 is a flowchart showing the procedure for calculating a retrieval condition feature vector in accordance with the preferred embodiment of the present invention.

First, the similar document retrieval processing will be explained with reference to the drawings. FIG. 11 is a flowchart showing the procedure for calculating the retrieval condition feature vector performed in the retrieval condition feature vector calculating section 117.

In step 1101, it is checked whether or not a character string entered through the condition input section 116 is a string of document numbers. When the entered character string is a string of document numbers, the control flow proceeds to step 1102. Otherwise, the entered character string is regarded as a string of keywords and the control flow proceeds to step 1103. More specifically, if an entered character string consists of numeric characters including at least one of digits "0" to "9" joined by comma ",", the entered character string is judged as a string of document numbers.

In step 1102, when the entered character string consists of document numbers, a feature vector $U_d$ of the document d contained in the entered character string is obtained with reference to the document principal component analysis result file 115. Then, an average vector R of the obtained feature vectors $U_d$ is calculated. The average vector R is obtained by multiplying a sum of document feature vectors with an inverse of the document number r.

In step 1103, when the entered character string consists of a total of r keywords, a M-dimensional vector E is created so that a component corresponding to a keyword number of each entered keyword is 1/r and the remaining components are 0.

In step 1104, a K-dimensional vector R is calculated with reference to the keyword principal component analysis result file 113 and the keyword weight file 107.

$$R=\Theta^{-1}*V*W*E \qquad (10)$$

where $\Theta^{-1}$ represents a diagonal matrix of K lines×K rows containing an inversed contribution factor $\theta_j^{-1}$ of each dimension of the keyword feature vector, V represents a keyword feature matrix of K lines×M rows containing a keyword feature vector Vt of the keyword t in the t-th row, and W represents a diagonal matrix of M lines×M rows containing the weight $w_t$ of each keyword as an element of t-th line and t-th row.

In step 1105, the K-dimensional vector R created in step 1102 or steps 1103 to 1104 is recognized as a retrieval condition feature vector and sent to the first similar document retrieving section 119 and to the second similar document retrieving section 120.

In obtaining the vector R in step 1104, only necessary thing is to obtain the keyword weight $w_t$ corresponding to the component of E which is not 0 and the keyword feature vector $V_t$ from the keyword weight file 107 and the keyword principal component analysis result file 113. When the total number r of input keywords is in the level of several tens or less, calculation of the vector R can be performed speedily.

After the retrieval condition feature vector calculating section 117 has obtained the retrieval condition feature vector R, the first similar document retrieving section 119 calculates an inner product between the document feature vector $U_d$ stored in the document principal component analysis result file 115 and the retrieval condition feature vector R to select 1st to α-th largest documents in the calculated inner product value, where α is a predetermined parameter representing a "displayed similar document number." Then, a total of α sets, each set being a combination of a document number and an inner product between $U_d$ and R, are sent to the result display section 123.

At the same time, the second similar document retrieving section 120 calculates a distance between the document feature vector $U_d$ stored in the document principal component analysis result file 115 and the retrieval condition feature vector R to select 1st to α-th smallest documents in the calculated distance value. Then, a total of α sets, each set being a combination of a document number and a distance between $U_d$ and R, are sent to the result display section 123.

Regarding the method for effectively selecting $1^{st}$ to α-th largest inner product values or $1^{st}$ to α-th smallest distance values with respect to the vector R from numerous vectors, unexamined Japanese patent publication 11-363058 discloses a "vector index building method and similar vector retrieval method" and other conventionally known vector retrieval methods can be used to effectively obtain a total of α similar documents. Details of such high-speed retrieval method of similar vectors give no influence to the gist of the present invention and therefore explanation will not be necessary.

Next, the relevant keyword extraction processing will be explained with reference to the drawings. FIG. 12 is a flowchart showing the procedure for calculating the extracting condition feature vector performed in the extracting condition feature vector calculating section 118.

In step 1201, it is checked whether or not a character string entered through the condition input section 116 is a string of keywords. When the entered character string is a string of keywords, the control flow proceeds to step 1202. Otherwise, the entered character string is regarded as a string of document numbers and the control flow proceeds to step 1203. More specifically, if an entered character string consists of numeric characters including at least one of digits "0" to "9" joined by comma ",", the entered character string is judged as a string of document numbers. Otherwise, the entered character string is regarded as a string of keywords.

In step 1202, when the entered character string consists of keywords, a feature vector $V_t$ of the keyword t contained in the entered character string is obtained with reference to the keyword principal component analysis result file 113. Then, an average vector R of the obtained feature vectors $V_t$ is calculated. The average vector R is obtained by multiplying a sum of keyword feature vectors with an inverse of the keyword number r.

In step 1203, when the entered character string consists of a total of r document numbers, a N-dimensional vector E is created so that a component corresponding to a document number of each entered document is 1/r and the remaining components are 0.

In step 1204, a K-dimensional vector R is calculated with reference to the document principal component analysis result file 115 and the document length file 105.

$$R = \Lambda^{-1} * U * L^{-1} * E \qquad (11)$$

where $\Lambda^{-1}$ represents a diagonal matrix of K lines×K rows containing an inversed contribution factor $\lambda_j^{-1}$ of each dimension of the document feature vector, U represents a document feature matrix of K lines×N rows containing a document feature vector $U_d$ of the document number d in the d-th row, and $L^{-1}$ represents a diagonal matrix of N lines×N rows containing the document length $l_d$ of each document d as an element of d-th line and d-th row.

In step 1205, the K-dimensional vector R created in step 1202 or steps 1203 to 1204 is recognized as an extracting condition feature vector and sent to the first relevant keyword extracting section 121 and to the second relevant keyword extracting section 122.

In obtaining the vector R in step 1204, only necessary thing is to obtain the document length $l_d$ corresponding to the component of E which is not 0 and the document feature vector $U_d$ from the document length file 105 and the document principal component analysis result file 115. When the total number r of input document numbers is in the level of several tens or less, calculation of the vector R can be performed speedily.

After the extracting condition feature vector calculating section 118 has obtained the extracting condition feature vector R, the first relevant keyword extracting section 121 calculates an inner product between the keyword feature vector $V_t$ stored in the keyword principal component analysis result file 113 and the extracting condition feature vector R to select 1st to β-th largest keywords in the calculated inner product value, where β is a predetermined parameter representing a "displayed relevant keyword number." Then, a total of β sets, each set being a combination of a keyword and an inner product between $V_t$ and R, are sent to the result display section 123.

At the same time, the second relevant keyword extracting section 122 calculates a distance between the keyword feature vector $V_t$ stored in the keyword principal component analysis result file 113 and the extracting condition feature vector R to select 1st to β-th smallest keywords in the calculated distance value. Then, a total of β sets, each set being a combination of a keyword and a distance between $V_t$ and R, are sent to the result display section 123.

Regarding the method for effectively selecting 1st to β-th largest inner product values or $1^{st}$ to β-th smallest distance values with respect to the vector R from numerous vectors, unexamined Japanese patent publication 11-363058 discloses a "vector index building method and similar vector retrieval method" and other conventionally known vector retrieval methods can be used to effectively obtain a total of β relevant keywords. Details of such high-speed retrieval method of similar vectors give no influence to the gist of the present invention and therefore explanation will not be necessary.

After both of α similar documents and β relevant keywords are obtained in this manner, the result display section 123 selects either the result based on the inner product or the result based on the distance according to the setting values of two kinds of parameters: i.e., the document similarity calculating mode ("inner product" or "distance") and the keyword relevancy calculating mode ("inner product" or "distance"). Then, the result display section 123 displays character strings representing β keywords together with similarity values of β keywords as a relevant keyword extraction result. Furthermore, the result display section 123 obtains the titles of the α similar documents based on their document numbers from the newspaper full text database 101. Then, the result display section 123 displays three items, i.e.,"document number", "title", and "similarity", identifying each of the α similar documents thus extracted.

In this manner, the processing for the stage (III) is accomplished, thereby terminating the similar document retrieval and relevant keyword extracting processing responsive to an arbitrary input.

The similar document retrieving and relevant keyword extracting system shown in FIG. 1 operates as described above.

As described above, the similar document retrieving apparatus and the relevant keyword extracting apparatus according to a preferred embodiment of the present invention expresses the frequency-of-appearance of each keyword contained in a concerned document as a document profile vector and also expresses the frequency-of-appearance of a concerned keyword in each document as a keyword profile vector. The document length data, the keyword weight data, and the component dispersion (i.e., standard deviation) are independently reflected to each profile as a weight (i.e., the number of components) in the calculation of the inner product between vectors (as a similarity measure) or as a weight (i.e., the number of vectors) in the principal component analysis.

In this case, the vector representation in the document profile and in the keyword profile is not dependent on the conversion (i.e., normalization) of frequency-of-occurrence. The document length data, the keyword weight data, and the component dispersion are relevant to the conversion of frequency-of-occurrence. As described above, the document length data, the keyword weight data, and the component dispersion are indirectly reflected as the weight in the calculation of the inner product between vectors or as the weight in the principal component analysis. Thus, it becomes possible to normalize the feature vector of each document and each keyword without depending on the conversion of frequency-of-occurrence.

Accordingly, the present invention solves the fundamental problems caused in an apparatus employing a conventional LSI method which is used in a statistic analysis on the single matrix data directly converted from the keyword frequency-of-occurrence data F. More specifically, the present invention solves the problem of asymmetry caused in the conversion of keyword frequency-of-occurrence, as well as the problem of non-stability caused by the mergence of documents or keywords with respect to the document similarity or the keyword relevancy. As a result, the present invention makes it possible to provide the similar document retrieving apparatus and the relevant keyword extracting apparatus which are highly accurate.

The above-described embodiment depends on the specific methods to perform the word segmentation, the document length calculation, and the keyword weight calculation. However, the gist of the present invention is not dependent on the disclosed specific methods. Thus, various methods can be flexibly employed considering the type of document database, and conditions or purposes for the retrieval and extracting operation, or the like.

Even in such a case, the present invention differs from the conventional LSI method in that no adverse effects will be given to the principal component analysis result, as well as to the similar document retrieval result and the relevant keyword extraction result. In this respect, so-called moderate effect will be reflected to the analysis result and retrieval/extraction result.

As a result, the present invention makes it possible to provide a method for segmenting words, extracting keywords, calculating a document length, and calculating a keyword weight according to the type of document database as well as the conditions or purposes for the retrieval and extracting operation without causing adverse reaction. Thus, a very reliable and robust system is constructed.

Furthermore, in the foregoing description, the above-described embodiment was explained as a system performing both of the similar document retrieval and the relevant keyword extraction based on both of the similarity by the inner product and the similarity by the distance. However, it is needless to say that, if any part of the above-described system is functionally unnecessary, such sections or files can be omitted to construct a subset of the system of FIG. 1.

As apparent from the foregoing description, the similar document retrieving apparatus and the relevant keyword extracting apparatus according to the present invention can overcome the problems encountered in the prior art and can realize a highly reliable similar document retrieval and relevant keyword extracting operation.

Especially, when the present invention is applied to a large-scale document database, it becomes possible without being influenced by adverse reaction to provide a method for segmenting words, extracting keywords, calculating a document length, and calculating a keyword weight according to the type of document database as well as the conditions or purposes for the retrieval and extracting operation. Thus, it becomes possible to construct a very robust and highly accurate system.

What is claimed is:

1. A similar document retrieving apparatus applicable to a document database D which stores N document data containing a total of M kinds of keywords and is machine processible, for designating a retrieval condition consisting of a document group including at least one document $x_1, ---, x_r$ selected from said document database D and for retrieving documents similar to said document group of said retrieval condition from said document database D, said similar document retrieving apparatus comprising:

keyword frequency-of-occurrence calculating means for calculating a keyword frequency-of-occurrence data F which represents a frequency-of-occurrence $f_{dt}$ of each keyword t appearing in each document d stored in said document database D;

document length calculating means for calculating a document length data L which represents a length $l_d$ of said each document d;

keyword weight calculating means for calculating a keyword weight data W which represents a weight $w_t$ of each keyword t of said M kinds of keywords appearing in said document database D;

document profile vector producing means for producing a M-dimensional document profile vector $P_d$ having components respectively representing a relative frequency-of-occurrence $p_{dt}$ of each keyword t in the concerned document d;

document principal component analyzing means for performing a principal component analysis on a document profile vector group of a document group in said document database D and for obtaining a predefined (K)-dimensional document feature vector $U_d$ corresponding to said document profile vector $P_d$ for said each document d; and similar document retrieving means for receiving said retrieval condition consisting of the document group including at least one document $x_1, ---, x_r$ selected from said document database D, calculating a similarity between each document d and said retrieval condition based on a document feature vector of said received document group and the document feature vector of each document d in said document database D, and outputting a designated number of similar documents in order of the calculated similarity.

2. The similar document retrieving apparatus in accordance with claim 1, wherein said similar document retrieving means calculates the similarity between each document d and said retrieval condition based on an inner product between the document feature vector of said received document group and said document feature vector of each document d.

3. The similar document retrieving apparatus in accordance with claim 1, wherein said similar document retrieving means calculates the similarity between each document d and said retrieval condition based on a distance between the document feature vector of said received document group and said document feature vector of each document d.

4. The similar document retrieving apparatus in accordance with claim 1, wherein said document principal component analyzing means calculates the inner product between two document profile vectors $P_a$ and $P_b$ of two documents a and b contained in the document database D by using a product-sum of weighted components reflecting said keyword weight data W and a degree of dispersion (i.e., an evaluation value of standard deviation) of components $P_{at}$ and $P_{bt}$ of said document profile vectors $P_a$ and $p_b$, and performs said principal component analysis on the assumption that the document profile vectors of said document d of the document length $l_d$ are contained in the document profile vector group by the number proportional to a ratio $g_d/l_d$, where $g_d$ represents the total number of all keywords appearing in the document d and $l_d$ represents the document length of the document d.

5. The similar document retrieving apparatus in accordance with claim 4, wherein said document principal component analyzing means obtains said document feature vector on the assumption that the degree of dispersion of the component $P_{dt}$ corresponding to the keyword t, of the document profile vector $P_d$ of each document d in the document database D, is expressed by a square root of $h_t/f$, where $h_t$ represents an overall frequency-of-occurrence value of the keyword t and f represents a sum of frequency-of-occurrence values of all keywords.

6. The similar document retrieving apparatus in accordance with claim 4, wherein said document principal component analyzing means calculates the inner product between two document profile vectors $P_a$ and $P_b$ of two documents a and b contained in the document database D by dividing each of the components $p_{at}$ and $P_{bt}$ corresponding to the keyword t of the document profile vectors $P_a$ and $P_b$ by the degree of dispersion of respective components and then multiplying the divisions thus obtained each other, and then multiplying the resultant value with the keyword weight data $w_t$, and then obtaining a sum of the thus weighted value for all of the keywords t.

7. The similar document retrieving apparatus in accordance with claim 1, wherein said document length calculating means compares a character number of the concerned document d with a predetermined threshold $l_0$ and stores $l_0$ as the length of said concerned document d when the character number of the concerned document d is less than $l_0$ and stores a δ-th (δ is a nonnegative integer) root of said character number when the character number of the concerned document d is equal to or larger than $l_0$.

8. The similar document retrieving apparatus in accordance with claim 1, wherein said document length calculating means compares a total number of keywords appearing in the concerned document d with a predetermined threshold $l_0$ and stores $l_0$ as the length of said concerned document d when the total number of keywords is less than $l_0$ and stores a δ-th (δ is a nonnegative integer) root of said total number of keywords when the character total number of keywords is equal to or larger than $l_0$.

9. The similar document retrieving apparatus in accordance with claim 1, wherein said keyword weight calculating means calculates the weight $w_t$ of the concerned keyword t according to the following formula $$1+\log_2((N+\in)/(n+\in))$$

where N represents the number of all documents, $\in$ represents a constant, and n represents the number of documents involving the concerned keyword t.

10. The similar document retrieving apparatus in accordance with claim 1, wherein said keyword weight calculating means calculates the weight $w_t$ of the concerned keyword t according to the following formula $$\log_2((N+\in+1)/(n+\in))$$

where N represents the number of all documents, $\in$ represents a constant, and n represents the number of documents involving the concerned keyword t.

11. The similar document retrieving apparatus in accordance with claim 1, wherein said document profile vector producing means calculates the relevant frequency-of-occurrence $p_{dt}$ of each keyword t in the concerned document d by dividing the frequency-of-occurrence $f_{dt}$ of each keyword t in the concerned document d by a sum $\Sigma f_{dj}$ of the frequency-of-occurrence value of all keywords j appearing in the concerned document d.

12. A similar document retrieving apparatus applicable to a document database D which stores N document data containing a total of M kinds of keywords and is machine processible, for designating a retrieval condition consisting of a keyword group including at least one keyword $y_1, ---, y_s$ selected from said document database D and for retrieving documents relevant to said retrieval condition from said document database D, said similar document retrieving apparatus comprising:

keyword frequency-of-occurrence calculating means for calculating a keyword frequency-of-occurrence data F which represents a frequency-of-occurrence $f_{dt}$ of each keyword t appearing in each document d stored in said document database D;

document length calculating means for calculating a document length data L which represents a length $l_d$ of said each document d;

keyword weight calculating means for calculating a keyword weight data W which represents a weight $w_t$ of each keyword t of said M kinds of keywords appearing in said document database D;

document profile vector producing means for producing a M-dimensional document profile vector $P_d$ having components respectively representing a relative frequency-of-occurrence $p_{dt}$ of each keyword t in the concerned document d;

keyword profile vector producing means for producing a N-dimensional keyword profile vector $Q_t$ having components respectively representing a relative frequency-of-occurrence $q_{dt}$ of the concerned keyword t in each document d;

document principal component analyzing means for performing a principal component analysis on a document profile vector group of a document group in said document database D and for obtaining a predefined (K)-dimensional document feature vector $U_d$ corresponding to said document profile vector $P_d$ for said each document d;

keyword principal component analyzing means for performing a principal component analysis on a keyword profile vector group of a keyword group in said document database D and for obtaining a predefined (K)-dimensional keyword feature vector $V_t$ corresponding to said keyword profile vector $Q_t$ for said each keyword t, said keyword feature vector having the same dimension as that of said document feature vector, as well as for obtaining a keyword contribution factor (i.e., eigenvalue of a correlation matrix) $\theta_j$ of each dimension j;

retrieval condition feature vector calculating means for receiving said retrieval condition consisting of keyword group including at least one keyword $y_1, ---, y_s$, and for calculating a retrieval condition feature vector corresponding to said retrieval condition based on said keyword weight data of the received keyword group, said keyword feature vector and said keyword contribution factor; and similar document retrieving means for calculating a similarity between each document d and said retrieval condition based on the calculated retrieval condition feature vector and a document feature vector of said each document d, and outputting a designated number of similar documents in order of the calculated similarity.

13. The similar document retrieving apparatus in accordance with claim 12, wherein said similar document retrieving means calculates the similarity between each document d and said retrieval condition based on an inner product between said retrieval condition feature vector and said document feature vector of each document d.

14. The similar document retrieving apparatus in accordance with claim 12, wherein said similar document retrieving means calculates the similarity between each document d and said retrieval condition based on a distance between the retrieval condition feature vector and said document feature vector of each document d.

15. The similar document retrieving apparatus in accordance with claim 12, wherein said document principal component analyzing means calculates the inner product between two document profile vectors $P_a$ of $P_b$ of two documents a and b contained in the document database D by using a product-sum of weighted components reflecting said keyword weight data W and a degree of dispersion (i.e., an evaluation value of standard deviation) of components $p_{at}$ and $p_{bt}$ of said document profile vectors $P_a$ and $P_b$, and performs said principal component analysis on the assumption that the document profile vectors of said document d of the document length $l_d$ are contained in the document profile vector group by the number proportional to a ratio $g_d/l_d$, where $g_d$ represents the total number of all keywords appearing in the document d and $l_d$ represents the document length of the document d.

16. The similar document retrieving apparatus in accordance with claim 15, wherein said document principal component analyzing means obtains said document feature vector on the assumption that the degree of dispersion of the component $p_{dt}$ corresponding to the keyword t, of the document profile vector $P_d$ of each document d in the document database D, is expressed by a square root of $h_t/f$, where $h_t$ represents an overall frequency-of-occurrence value of the keyword t and f represents a sum of frequency-of-occurrence values of all keywords.

17. The similar document retrieving apparatus or the relevant keyword extracting apparatus in accordance with claim 15, wherein said document principal component analyzing means calculates the inner product between two document profile vectors $P_a$ and $P_b$ of two documents a and b contained in the document database D by dividing each of the components $p_{at}$ and $p_{bt}$ corresponding to the keyword t of the document profile vectors $P_a$ and $P_b$ by the degree of dispersion of respective components and then multiplying the divisions thus obtained each other, and then multiplying the resultant value with the keyword weight data $w_t$, and then obtaining a sum of the thus weighted value for all of the keywords t.

18. The similar document retrieving apparatus in accordance with claim 12, wherein said keyword principal component analyzing means calculates the inner product between two keyword profile vectors $Q_a$ and $Q_b$ of two keywords Ka and Kb contained in the document database D by using a product-sum of weighted components reflecting said document length data L and a degree of dispersion (i.e., an evaluation value of standard deviation) of components $q_{ad}$ and $q_{bd}$ of said keyword profile vectors $Q_a$ and $Q_b$, and performs said principal component analysis on the assumption that the keyword profile vectors of said keyword t of the keyword weight $w_t$ are contained in the keyword profile vector group by the number proportional to $h_t^* w_t$, where $h_t$ represents an overall frequency-of-occurrence value of keyword t and $w_t$ represents the keyword weight of the keyword t.

19. The similar document retrieving apparatus in accordance with claim 18, wherein said keyword principal component analyzing means obtains said keyword feature vector on the assumption that the degree of dispersion of the component $q_{td}$ corresponding to the document d, of the keyword profile vector $Q_t$ of each keyword t in the document database D, is expressed by a square root of $g_d/f$, where $g_d$ represents the total number of all keywords appearing in the document d and f represents a sum of frequency-of-occurrence values of all keywords.

20. The similar document retrieving apparatus in accordance with claim 18, wherein said keyword principal component analyzing means calculates the inner product between two keyword profile vectors $Q_a$ and $Q_b$ of two keywords Ka and Kb contained in the document database D by dividing each of the components $q_{ad}$ and $q_{bd}$ corresponding to the document d of the keyword profile vectors $Q_a$ and $Q_b$ by the degree of dispersion of respective components and then multiplying the divisions thus obtained each other, and then dividing the resultant value by the document length $l_d$, and then obtaining a sum of the thus weighted value for all of the documents d.

21. The similar document retrieving apparatus in accordance with claim 12, wherein said document length calculating means compares a character number of the concerned document d with a predetermined threshold $l_0$ and stores $l_0$ as the length of said concerned document d when the character number of the concerned document d is less than $l_0$ and stores a δ-th (δ is a nonnegative integer) root of said character number when the character number of the concerned document d is equal to or larger than $l_0$.

22. The similar document retrieving apparatus in accordance with claim 12, wherein said document length calculating means compares a total number of keywords appearing in the concerned document d with a predetermined threshold $l_0$ and stores $l_0$ as the length of said concerned document d when the total number of keywords is less than $l_0$ and stores a δ-th (δ is a nonnegative integer) root of said total number of keywords when the character total number of keywords is equal to or larger than $l_0$.

23. The similar document retrieving apparatus in accordance with claim 12, wherein said keyword weight calculating means calculates the weight $w_t$ of the concerned keyword t according to the following formula $$1+\log_2((N+\in)/(n+\in))$$

where N represents the number of all documents, $\in$ represents a constant, and n represents the number of documents involving the concerned keyword t.

24. The similar document retrieving apparatus in accordance with claim 12, wherein said keyword weight calculating means calculates the weight $w_t$ of the concerned keyword t according to the following formula $$\log_2((N+\in+1)/(n+\in))$$

where N represents the number of all documents, $\in$ represents a constant, and n represents the number of documents involving the concerned keyword t.

25. The similar document retrieving apparatus in accordance with claim 12, wherein said document profile vector producing means calculates the relevant frequency-of-occurrence $p_{dt}$ of each keyword t in the concerned document d by dividing the frequency-of-occurrence $f_{dt}$ of each keyword t in the concerned document d by a sum $\Sigma f_{dj}$ of the frequency-of-occurrence value of all keywords j appearing in the concerned document d.

26. The similar document retrieving apparatus in accordance with claim 12, wherein said keyword profile vector producing means calculates the relevant frequency-of-occurrence $q_{dt}$ of the concerned keyword t in each document d by dividing the frequency-of-occurrence $f_{dt}$ of the concerned keyword t in said each document d by a sum $\Sigma f_{jt}$ of the frequency-of-occurrence value of the concerned keywords t in all documents j containing the concerned keyword t.

27. A relevant keyword extracting apparatus applicable to a document database D which stores N document data containing a total of M kinds of keywords and is machine processable, for designating an extracting condition consisting of a keyword group including at least one keyword $y_1, ---, y_s$ selected from said document database D and for extracting keywords relevant to said keyword group of said extracting condition from said document database D, said relevant keyword extracting apparatus comprising:

keyword frequency-of-occurrence calculating means for calculating a keyword frequency-of-occurrence data F which represents a frequency-of-occurrence $f_{dt}$ of each keyword t appearing in each document d stored in said document database D;

document length calculating means for calculating a document length data L which represents a length $l_d$ of said each document d;

keyword weight calculating means for calculating a keyword weight data W which represents a weight $w_t$ of each keyword t of said M kinds of keywords appearing in said document database D;

keyword profile vector producing means for producing a N-dimensional keyword profile vector $Q_t$ having components respectively representing a relative frequency-of-occurrence $q_{dt}$ of the concerned keyword t in each document d;

keyword principal component analyzing means for performing a principal component analysis on a keyword profile vector group of a keyword group in said document database D and for obtaining a predefined (K)-dimensional keyword feature vector $V_t$ corresponding to said keyword profile vector $Q_t$ for said each keyword t; and relevant keyword extracting means for receiving said extracting condition consisting of the keyword group including at least one keyword $y_1, ---, y_s$ selected from said document database D, calculating a relevancy between each keyword t and said extracting condition based on a keyword feature vector of said received keyword group and the keyword feature vector of each keyword t in said document database D, and outputting a designated number of relevant keywords in order of the calculated relevancy.

28. The relevant keyword extracting apparatus in accordance with claim 27, wherein said relevant keyword extracting means calculates the relevancy between each keyword t and said extracting condition based on an inner product between the keyword feature vector of said received keyword group and said keyword feature vector of each keyword t.

29. The relevant keyword extracting apparatus in accordance with claim 27, wherein said relevant keyword extracting means calculates the relevancy between each keyword t and said extracting condition based on a distance between the keyword feature vector of said received keyword group and said keyword feature vector of each keyword t.

30. The relevant keyword extracting apparatus in accordance with claim 27, wherein said keyword principal component analyzing means calculates the inner product between two keyword profile vectors $Q_a$ and $Q_b$ of two keywords Ka and Kb contained in the document database D by using a product-sum of weighted components reflecting said document length data L and a degree of dispersion (i.e., an evaluation value of standard deviation) of components $q_{ad}$ and $q_{bd}$ of said keyword profile vectors $Q_a$ and $Q_b$, and performs said principal component analysis on the assumption that the keyword profile vectors of said keyword t of the keyword weight $w_t$ are contained in the keyword profile vector group by the number proportional to $h_t{}^*w_t$, where $h_t$ represents an overall frequency-of-occurrence value of keyword t and $w_t$ represents the keyword weight of the keyword t.

31. The relevant keyword extracting apparatus in accordance with claim 30, wherein said keyword principal component analyzing means obtains said keyword feature vector on the assumption that the degree of dispersion of the component $q_{td}$ corresponding to the document d, of the keyword profile vector $Q_t$ of each keyword t in the document database D, is expressed by a square root of $g_d/f$, where $g_d$ represents the total number of all keywords appearing in the document d and f represents a sum of frequency-of-occurrence values of all keywords.

32. The relevant keyword extracting apparatus in accordance with claim 30, wherein said keyword principal component analyzing means calculates the inner product between two keyword profile vectors $Q_a$ and $Q_b$ of two keywords Ka and Kb contained in the document database D by dividing each of the components $q_{ad}$ and $q_{bd}$ corresponding to the document d of the keyword profile vectors $Q_a$ and $Q_b$ by the degree of dispersion of respective components and then multiplying the divisions thus obtained each other, and then dividing the resultant value by the document length $l_d$, and then obtaining a sum of the thus weighted value for all of the documents d.

33. The relevant keyword extracting apparatus in accordance with claim 27, wherein said document length calculating means compares a character number of the concerned document d with a predetermined threshold $l_0$ and stores $l_0$ as the length of said concerned document d when the character number of the concerned document d is less than $l_0$ and stores δ-th (δ is a nonnegative integer) root of said character number when the character number of the concerned document d is equal to or larger than $l_0$.

34. The relevant keyword extracting apparatus in accordance with claim 27, wherein said document length calculating means compares a total number of keywords appearing in the concerned document d with a predetermined threshold $l_0$ and stores $l_0$ as the length of said concerned document d when the total number of keywords is less than $l_0$ and stores a δ-th (δ is a nonnegative integer) root of said total number of keywords when the character total number of keywords is equal to or larger than $l_0$.

35. The relevant keyword extracting apparatus in accordance with claim 27, wherein said keyword weight calculating means calculates the weight $w_t$ of the concerned keyword t according to the following formula $$1+\log_2((N+\in)/(n+\in))$$

where N represents the number of all documents, $\in$ represents a constant, and n represents the number of documents involving the concerned keyword t.

36. The relevant keyword extracting apparatus in accordance with claim 27, wherein said keyword weight calculating means calculates the weight $w_t$ of the concerned keyword t according to the following formula $$\log_2((N+\in+1)/(n+\in))$$

where N represents the number of all documents, $\in$ represents a constant, and n represents the number of documents involving the concerned keyword t.

37. The relevant keyword extracting apparatus in accordance with claim 27, wherein said keyword profile vector producing means calculates the relevant frequency-of-occurrence $q_{dt}$ of the concerned keyword t in each document d by dividing the frequency-of-occurrence $f_{dt}$ of the concerned keyword t in said each document d by a sum $\Sigma f_{jt}$ of the frequency-of-occurrence value of the concerned keywords t in all documents j containing the concerned keyword t.

38. A relevant keyword extracting apparatus applicable to a document database D which stores N document data containing a total of M kinds of keywords and is machine processible, for designating an extracting condition consisting of a document group including at least one document $x_1, ---, x_r$ selected from said document database D and for extracting keywords relevant to the document group of said extracting condition from said document database D, said relevant keyword extracting apparatus comprising:

keyword frequency-of-occurrence calculating means for calculating a keyword frequency-of-occurrence data F which represents a frequency-of-occurrence $f_{dt}$ of each keyword t appearing in each document d stored in said document database D;

document length calculating means for calculating a document length data L which represents a length $l_d$ of said each document d;

keyword weight calculating means for calculating a keyword weight data W which represents a weight $w_t$ of each keyword t of said M kinds of keywords appearing in said document database D;

document profile vector producing means for producing a M-dimensional document profile vector $P_d$ having components respectively representing a relative frequency-of-occurrence $p_{dt}$ of each keyword t in the concerned document d;

keyword profile vector producing means for producing a N-dimensional keyword profile vector $Q_t$ having components respectively representing a relative frequency-of-occurrence $q_{dt}$ of the concerned keyword t in each document d;

document principal component analyzing means for performing a principal component analysis on a document profile vector group of a document group in said document database D and for obtaining a predefined (K)-dimensional document feature vector $U_d$ corresponding to said document profile vector $P_d$ for said each document d as well as for obtaining a document contribution factor (i.e., eigenvalue of a correlation matrix) $\lambda_j$ of each dimension j;

keyword principal component analyzing means for performing a principal component analysis on a keyword profile vector group of a keyword group in said document database D and for obtaining a predefined (K)-dimensional keyword feature vector $V_t$ corresponding to said keyword profile vector $Q_t$ for said each keyword t, said keyword feature vector having the same dimension as that of said document feature vector;

extracting condition feature vector calculating means for receiving said extracting condition consisting of the document group including at least one document $x_1, ---, X_r$, and for calculating an extracting condition feature vector corresponding to said extracting condition based on said document length data of the received document group, said document feature vector and said document contribution factor; and relevant keyword extracting means for calculating a relevancy between each keyword t and said extracting condition based on the calculated extracting condition feature vector and a keyword feature vector of each keyword t, and outputting a designated number of relevant keywords in order of the calculated relevancy.

39. The relevant keyword extracting apparatus in accordance with claim 38, wherein said relevant keyword extracting means calculates the relevancy between each keyword t and said extracting condition based on an inner product between said extracting condition feature vector and said keyword feature vector of each keyword t.

40. The relevant keyword extracting apparatus in accordance with claim 38, wherein said relevant keyword extracting means calculates the relevancy between each keyword t and said extracting condition based on a distance between said extracting condition feature vector and said keyword feature vector of each keyword t.

41. The relevant keyword extracting apparatus in accordance with claim 38, wherein said document principal component analyzing means calculates the inner product between two document profile vectors $P_a$ and $P_b$ of two documents a and b contained in the document database D by using a product-sum of weighted components reflecting said keyword weight data W and a degree of dispersion (i.e., an evaluation value of standard deviation) of components $p_{at}$ and $p_{bt}$ of said document profile vectors $P_a$ and $P_b$, and performs said principal component analysis on the assumption that the document profile vectors of said document d of the document length $l_d$ are contained in the document profile vector group by the number proportional to a ratio $g_d/l_d$, where $g_d$ represents the total number of all keywords appearing in the document d and $l_d$ represents the document length of the document d.

42. The relevant keyword extracting apparatus in accordance with claim 41, wherein said document principal component analyzing means obtains said document feature vector on the assumption that the degree of dispersion of the component $p_{dt}$ corresponding to the keyword t, of the document profile vector $P_d$ of each document d in the document database D, is expressed by a square root of $h_t/f$, where $h_t$ represents an overall frequency-of-occurrence value of the keyword t and f represents a sum of frequency-of-occurrence values of all keywords.

43. The relevant keyword extracting apparatus in accordance with claim 41, wherein said document principal component analyzing means calculates the inner product between two document profile vectors $P_a$ and $P_b$ of two documents a and b contained in the document database D by dividing each of the components $p_{at}$ and $p_{bt}$ corresponding to the keyword t of the document profile vectors $P_a$ and $P_b$ by the degree of dispersion of respective components and then multiplying the divisions thus obtained each other, and then multiplying the resultant value with the keyword weight data $w_t$, and then obtaining a sum of the thus weighted value for all of the keywords t.

44. The relevant keyword extracting apparatus in accordance with claim 38, wherein said keyword principal component analyzing means calculates the inner product between two keyword profile vectors $Q_a$ and $Q_b$ of two keywords Ka and Kb contained in the document database D by using a product-sum of weighted components reflecting said document length data L and a degree of dispersion (i.e., an evaluation value of standard deviation) of components $q_{ad}$ and $q_{bd}$ of said keyword profile vectors $Q_a$ and $Q_b$, and performs said principal component analysis on the assumption that the keyword profile vectors of said keyword t of the keyword weight $w_t$ are contained in the keyword profile vector group by the number proportional to $h_t*w_t$, where $h_t$ represents an overall frequency-of-occurrence value of keyword t and $w_t$ represents the keyword weight of the keyword t.

45. The relevant keyword extracting apparatus in accordance with claim 44, wherein said keyword principal component analyzing means obtains said keyword feature vector on the assumption that the degree of dispersion of the component $q_{td}$ corresponding to the document d, of the keyword profile vector $Q_t$ of each keyword t in the document database D, is expressed by a square root of $g_d/f$, where $g_d$ represents the total number of all keywords appearing in the document d and f represents a sum of frequency-of-occurrence values of all keywords.

46. The relevant keyword extracting apparatus in accordance with claim 44, wherein said keyword principal component analyzing means calculates the inner product between two keyword profile vectors $Q_a$ and $Q_b$ of two keywords Ka and Kb contained in the document database D by dividing each of the components $q_{ad}$ and $q_{bd}$ corresponding to the document d of the keyword profile vectors $Q_a$ and $Q_b$ by the degree of dispersion of respective components and then multiplying the divisions thus obtained each other, and then dividing the resultant value by the document length $l_d$, and then obtaining a sum of the thus weighted value for all of the documents d.

47. The relevant keyword extracting apparatus in accordance with claim 38, wherein said document length calculating means compares a character number of the concerned document d with a predetermined threshold $l_0$ and stores $l_0$ as the length of said concerned document d when the character number of the concerned document d is less than $l_0$ and stores a δ-th (δ is a nonnegative integer) root of said character number when the character number of the concerned document d is equal to or larger than $l_0$.

48. The relevant keyword extracting apparatus in accordance with claim 38, wherein said document length calculating means compares a total number of keywords appearing in the concerned document d with a predetermined threshold $l_0$ and stores $l_0$ as the length of said concerned document d when the total number of keywords is less than $l_0$ and stores a δ-th (δ is a nonnegative integer) root of said total number of keywords when the character total number of keywords is equal to or larger than $l_0$.

49. The relevant keyword extracting apparatus in accordance with claim 38, wherein said keyword weight calculating means calculates the weight $w_t$ of the concerned keyword t according to the following formula $$1+\log_2((N+\in)/(n+\in))$$

where N represents the number of all documents, $\in$ represents a constant, and n represents the number of documents involving the concerned keyword t.

50. The relevant keyword extracting apparatus in accordance with claim 38, wherein said keyword weight calculating means calculates the weight $w_t$ of the concerned keyword t according to the following formula $$\log_2((N+531+1)/(n+\in))$$

where N represents the number of all documents, $\in$ represents a constant, and n represents the number of documents involving the concerned keyword t.

51. The relevant keyword extracting apparatus in accordance with claim 38, wherein said document profile vector producing means calculates the relevant frequency-of-occurrence $p_{dt}$ of each keyword t in the concerned document d by dividing the frequency-of-occurrence $f_{dt}$ of each keyword t in the concerned document d by a sum $\Sigma f_{dj}$ of the frequency-of-occurrence value of all keywords j appearing in the concerned document d.

52. The relevant keyword extracting apparatus in accordance with claim 38, wherein said keyword profile vector producing means calculates the relevant frequency-of-occurrence $q_{dt}$ of the concerned keyword t in each document d by dividing the frequency-of-occurrence $f_{dt}$ of the concerned keyword t in said each document d by a sum $\Sigma f_{jt}$ of the frequency-of-occurrence value of the concerned keywords t in all documents j containing the concerned keyword t.

* * * * *